United States Patent
Crivella

(10) Patent No.: US 11,511,443 B2
(45) Date of Patent: Nov. 29, 2022

(54) METHOD AND APPARATUS FOR DRILLING A WORKPIECE

(71) Applicant: The Boeing Company, Chicago, IL (US)

(72) Inventor: Michelle Crivella, Charleston, SC (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 16/786,768

(22) Filed: Feb. 10, 2020

(65) Prior Publication Data

US 2021/0245371 A1 Aug. 12, 2021

(51) Int. Cl.
*B25J 15/06* (2006.01)
*B23Q 7/04* (2006.01)

(52) U.S. Cl.
CPC ............ *B25J 15/0683* (2013.01); *B23Q 7/04* (2013.01); *B25J 15/0616* (2013.01)

(58) Field of Classification Search
CPC . B23B 39/14; B23B 2270/30; B23B 2270/62; B23B 35/00; B23B 49/00; B23Q 7/04; B25J 11/005; B25J 15/0095; B25J 15/0683
See application file for complete search history.

(56) References Cited

U.S. PATENT DOCUMENTS

| | | | |
|---|---|---|---|
| 4,473,247 A * | 9/1984 | Itemadani | H01L 21/6838 294/183 |
| 7,498,796 B2 * | 3/2009 | Georgeson | B23B 49/00 324/260 |
| 8,267,188 B2 * | 9/2012 | Nicholson | B23Q 1/4876 173/32 |
| 9,308,592 B2 * | 4/2016 | Zagar | B23Q 3/002 |
| 11,192,192 B2 * | 12/2021 | Crivella | B23B 39/14 |
| 2002/0136612 A1 * | 9/2002 | Martinez | B23Q 17/24 408/14 |
| 2008/0077276 A1 * | 3/2008 | Montero Sanjuan | B21J 15/14 700/245 |

(Continued)

FOREIGN PATENT DOCUMENTS

| EP | 2461939 A2 | 6/2012 |
|---|---|---|
| WO | 2011015886 A2 | 2/2011 |

(Continued)

OTHER PUBLICATIONS

"Extended European Search Report Received for EP Application No. 21156029.7", dated Jul. 12, 2021, 9 Pages.

*Primary Examiner* — Paul T Chin

(57) ABSTRACT

A drilling end effector is provided for drilling a workpiece having a workpiece surface. The drilling end effector includes a chuck configured to hold a drilling tool, and a nosepiece configured to at least partially surround the drilling tool when the drilling tool is held by the chuck. The nosepiece includes an end portion, at least one suction cup, and at least one suction feed line. The at least one suction cup is fluidly connected to the at least one suction feed line that is configured to be fluidly connected to a suction system. The at least one suction cup is configured to be engaged in physical contact with the workpiece surface and pulled under suction by the suction system such that the at least one suction cup adheres to the workpiece surface to thereby hold the end portion of the nosepiece on the workpiece surface.

20 Claims, 16 Drawing Sheets

(56) References Cited

U.S. PATENT DOCUMENTS

| | | | | |
|---|---|---|---|---|
| 2012/0014759 | A1* | 1/2012 | Sarh | B23Q 9/0007 |
| | | | | 408/76 |
| 2016/0082598 | A1* | 3/2016 | Anducas Aregall | B21J 15/142 |
| | | | | 901/10 |
| 2017/0106924 | A1* | 4/2017 | Hafenrichter | B25J 11/0075 |
| 2018/0250833 | A1* | 9/2018 | Boria | B64F 5/40 |
| 2018/0326507 | A1 | 11/2018 | Halvorsen et al. | |
| 2020/0262048 | A1* | 8/2020 | Pospisil | B23B 49/00 |
| 2021/0284359 | A1* | 9/2021 | Soulie | B25J 15/0095 |

FOREIGN PATENT DOCUMENTS

| | | |
|---|---|---|
| WO | 2011015886 A3 | 2/2011 |
| WO | 2018065408 A1 | 4/2018 |

\* cited by examiner

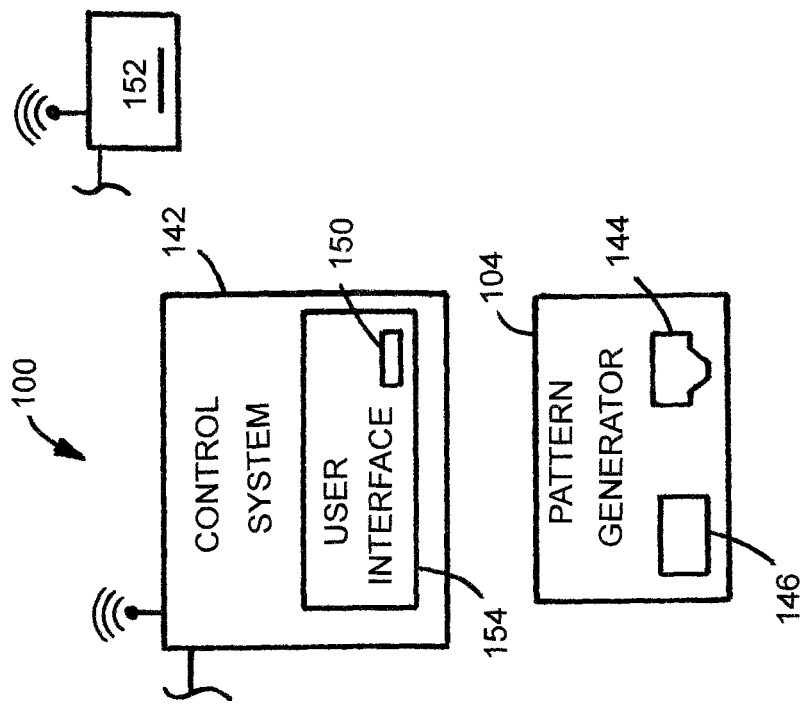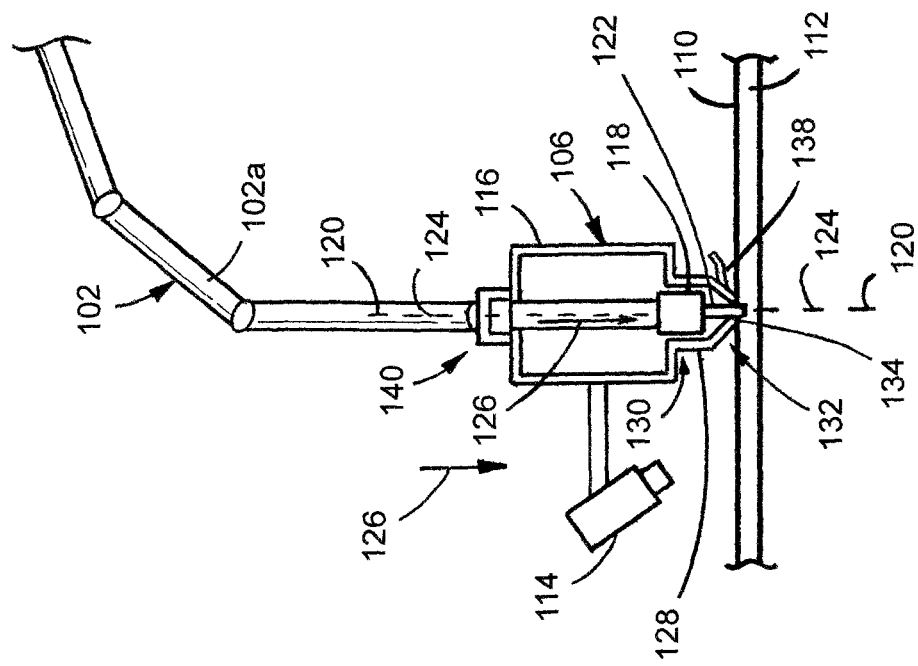
FIG.1

METHOD AND APPARATUS FOR DRILLING A WORKPIECE

BACKGROUND

Aircraft assembly, maintenance, and repair involves numerous drilling operations. For example, openings (e.g., holes, etc.) are drilled in aircraft components for receiving fasteners (e.g., rivets, bolts, screws, etc.) during assembly of the components; and drills are used to remove existing fasteners to enable replacement of damaged, worn, and/or structurally compromised components. Many drilling operations are now automated, for example using a gantry-style drilling system, a post-style drilling system, or articulated robot arms. Recently, the versatility and flexibility provided by articulated robot arms has increased the popularity thereof, especially in areas wherein there is limited space to perform drilling operations. However, articulated robot arms have limited stiffness along the length of the arm. Accordingly, when loads applied to the component (e.g., via engagement of the drilling end effector with the component surface, during the drilling operation, etc.) are transferred (e.g., applied, projected, etc.) to the joints of the articulate robot arm, the arm may bend and thereby cause the drilling tool to move (e.g., slide, skid, skate, etc.) along the surface of the component away from the target drilling location. For example, such movement of the drilling tool along the surface of the component away from the target drilling location may prevent the opening from being drilled in the accurate location, may damage (e.g., scratch, scrape, gash, etc.) the component and/or other structures (e.g., attaching substructure, etc.), and/or may increase the rate of broken drill bits.

One known approach to correcting undesired movement of the drilling tool along the component surface uses secondary encoders that measure the deflections of the joints of the robot arm. The measured deflections are fed from the secondary encoders to the robot control system, which uses the deflections to correct any resulting movement of the drilling tool away from the target drilling location. However, mounting the secondary encoders on the robot arm increases the complexity of the robot arm and increases the cost of manufacturing, assembling, and maintaining the articulated robot arm. Laser tracking systems are also known for correcting movement of the drilling tool away from the target drilling location by measuring the tool center point (TCP) of the articulated robot arm. However, such laser tracking systems require relatively precise calibration of the tracking system, rigid fixturing, and cameras with the ability to detect measurement targets, each of which increases the cost and complexity of the drilling system (e.g., of the articulated robot arm, of an automation cell in which the drilling operation is performed, of the control system, etc.). Other known approaches for correcting undesired movement of the drilling tool include normality sensors that measure whether the drilling tool is normal to the component surface. However, the addition of normality sensors increases the cost and complexity of the drilling system.

SUMMARY

In one aspect, a drilling end effector is provided for drilling a workpiece having a workpiece surface. The drilling end effector includes a chuck configured to hold a drilling tool, and a nosepiece configured to at least partially surround the drilling tool when the drilling tool is held by the chuck. The nosepiece includes an end portion. The nosepiece includes at least one suction cup and at least one suction feed line. The at least one suction cup is fluidly connected to the at least one suction feed line. The at least one suction feed line is configured to be fluidly connected to a suction system. The at least one suction cup is configured to be engaged in physical contact with the workpiece surface and pulled under suction by the suction system such that the at least one suction cup adheres to the workpiece surface to thereby hold the end portion of the nosepiece on the workpiece surface.

In another aspect, a drilling system is provided for drilling a workpiece having a workpiece surface. The drilling system includes a drilling platform and a drilling end effector configured to be held by the drilling platform. The drilling end effector includes a chuck configured to hold a drilling tool, and a nosepiece configured to at least partially surround the drilling tool when the drilling tool is held by the chuck. The nosepiece includes an end portion. The nosepiece includes at least one suction cup and at least one suction feed line. The at least one suction cup is fluidly connected to the at least one suction feed line. The at least one suction feed line is configured to be fluidly connected to a suction system. The at least one suction cup is configured to be engaged in physical contact with the workpiece surface and pulled under suction by the suction system such that the at least one suction cup adheres to the workpiece surface to thereby hold the end portion of the nosepiece on the workpiece surface.

In another aspect, a drilling end effector is provided for drilling a workpiece having a workpiece surface. The drilling end effector includes a chuck configured to hold a drilling tool, and a nosepiece configured to at least partially surround the drilling tool when the drilling tool is held by the chuck. The nosepiece includes an end portion that includes an end surface that is configured to face the workpiece surface during drilling of the workpiece. The nosepiece includes at least one suction feed line. The end surface of the end portion of the nosepiece includes the at least one suction cup. The at least one suction cup is fluidly connected to the at least one suction feed line. The at least one suction feed line is configured to be fluidly connected to a suction system. The nosepiece also includes a suction tube configured to collect chips during drilling of the workpiece. The at least one suction cup is configured to be engaged in physical contact with the workpiece surface and pulled under suction by the suction system such that the at least one suction cup adheres to the workpiece surface to thereby hold the end portion of the nosepiece on the workpiece surface.

BRIEF DESCRIPTION OF THE DRAWINGS

FIG. 1 is a schematic diagram illustrating a drilling system according to an implementation.

DETAILED DESCRIPTION

Figure 2:
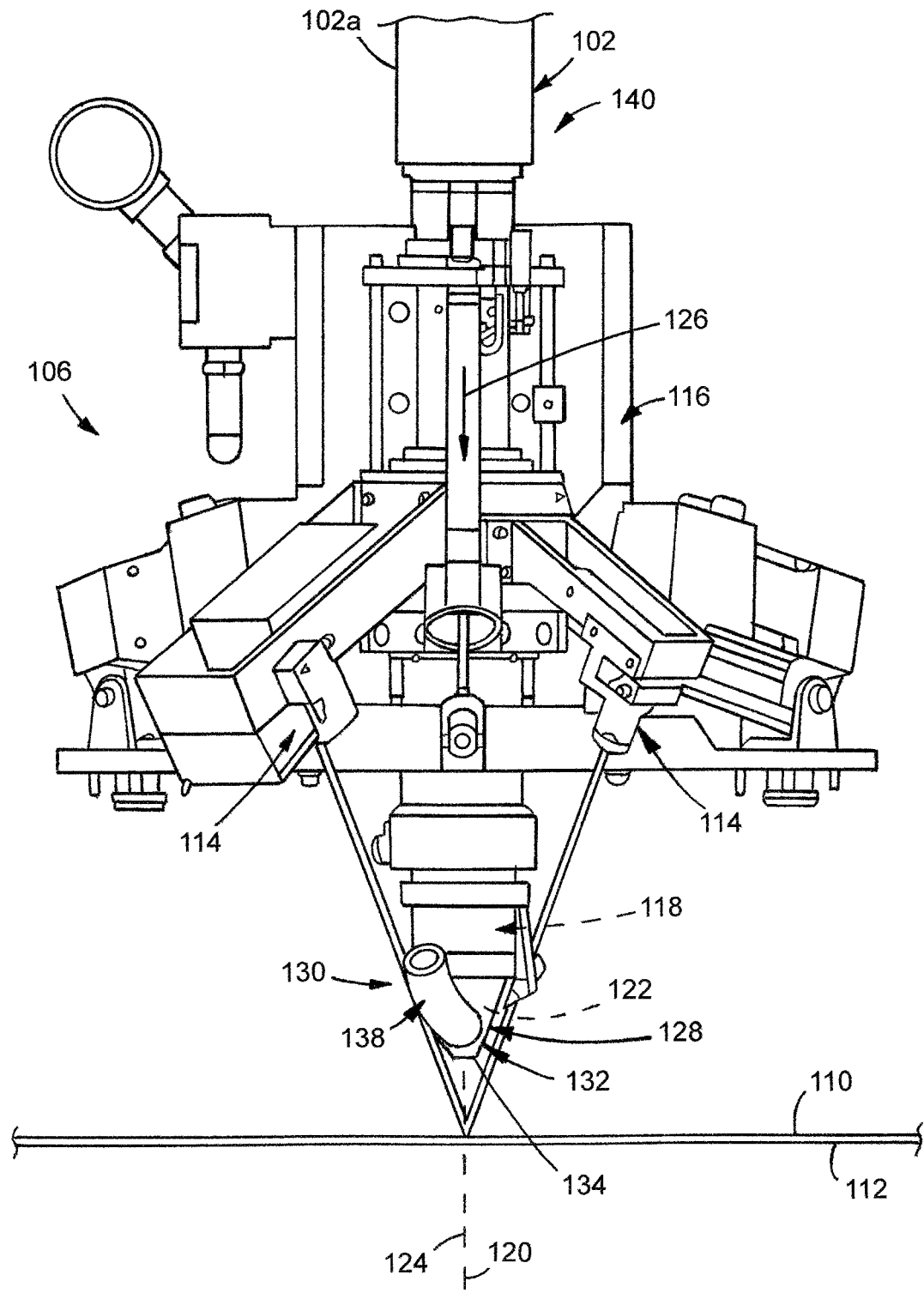
FIG. 2 is a perspective view of a portion of the drilling system shown in FIG. 1 illustrating a drilling end effector according to an implementation.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a drilling system for drilling a workpiece. The drilling system includes a pattern generator configured to apply a pattern on a workpiece surface of the workpiece at a reference location relative to a target drilling location. The drilling system includes a drilling end effector, which includes a chuck configured to hold a drilling tool. The drilling end effector also includes a nosepiece configured to at least partially surround the drilling tool when the drilling tool is held by the chuck. The nosepiece includes an end portion that is configured to be held on the workpiece surface of the workpiece. The drilling end effector also includes a camera configured to acquire an image of an area of the workpiece surface that includes the pattern. The image acquired by the camera indicates whether the end portion of the nosepiece is aligned with the pattern on the workpiece surface.

Certain implementations of the present disclosure facilitate aligning a drilling tool with a target drilling location on a workpiece surface. Certain implementations of the present disclosure facilitate detecting, reducing, and/or correcting for movement (e.g., sliding, skidding, skating, etc.) of the drilling tool away from the target drilling location on the workpiece surface, for example before performing a drilling operation on the workpiece.

Certain implementations of the present disclosure reduce the occurrence of openings being drilled at inaccurate locations (e.g., an opening misaligned with the target drilling location, etc.) on the workpiece surface. Certain implementations of the present disclosure reduce damage (e.g., scratches, scrapes, gashes, etc.) caused to the workpiece and/or other structures (e.g., attaching substructure, etc.) resulting from the drilling tool moving along the workpiece surface. Certain implementations of the present disclosure reduce the number of broken drilling tools resulting from repeated drilling operations. Certain implementations of the present disclosure facilitate detecting, preventing, reducing, and/or correcting for movement (e.g., sliding, skidding, skating, etc.) of a drilling tool away from the target drilling location without increasing the cost and/or complexity of one or more components (e.g., an articulated robot arm, a drilling end effector, the automation cell in which a drilling operation is performed, a control system, etc.) of the drilling system. For example, certain implementations of the present disclosure utilize the capabilities of an existing camera on a drilling end effector.

With references now to the figures, a schematic diagram of a drilling system 100 is provided in FIG. 1. The drilling system 100 includes a drilling platform 102, a pattern generator 104, and a drilling end effector 106. As will be described in more detail below, the pattern generator 104 is configured to apply a pattern (e.g., the pattern 108 shown in FIG. 5) on a workpiece surface 110 of a workpiece 112; and a camera 114 of the drilling end effector 106 is configured to acquire one or more images that indicate whether the drilling end effector 106 is aligned with the pattern on the workpiece surface 110.

Referring now to FIGS. 1 and 2, the drilling end effector 106 includes a base 116 and a chuck 118. The base 116 of the drilling end effector 106 is configured to be held by the drilling platform 102. The chuck 118 is held by the base 116 such that the chuck 118 is configured to rotate relative to the base 116 about an axis 120 of rotation during operation (e.g., drilling of the workpiece 112, etc.) of the drilling system 100. The drilling end effector 106 includes any suitable driving mechanism (not shown) operatively connected to the chuck 118 for driving rotation of the chuck 118 about the axis 120 of rotation (i.e., for exerting a torque on the chuck 118 that rotates the chuck 118 about the axis 120 of rotation), such as, but not limited to, an electric motor, a hand crank, a combustion engine, and/or the like. The chuck 118 is not visible in FIG. 2.

The chuck 118 is configured to hold a drilling tool 122 such that the axis 120 of rotation of the chuck 118 is aligned with a centerline axis 124 of the drilling tool 122. The drilling tool 122 is secured to the chuck 118 such that the drilling tool 122 is configured to rotate along with the chuck 118 about the axis 120 of rotation and about the centerline axis 124. Specifically, the drilling tool 122 can be rigidly secured to the chuck 118 such that the chuck 118 translates the torque provided by the driving mechanism to the drilling tool 122 to thereby rotate the drilling tool 122 about the axis of rotation 120 and the centerline axis 124. In some examples, the chuck 118 is configured to releasably hold the drilling tool 122 such that the drilling tool 122 can be selectively secured to and removed from the drilling end effector 106, for example for repair or replacement of the drilling tool 122, and/or for servicing, storing, moving, maintaining and/or the like of the drilling end effector 106. The drilling tool 122 is not visible in FIG. 2.

In operation of the drilling end effector 106 to drill into the workpiece surface 110, the drilling tool 122 is rotated about the axes 120 and 124 in a cutting direction (e.g., clockwise, counter-clockwise, etc.) that enables the drilling tool 122 is cut into the workpiece surface 110. As the drilling tool 122 is rotated about the axes 120 and 124 in the cutting direction, the drilling tool 122 is moved along the axes 120 and 124 toward (e.g., in the direction of the arrow 126, etc.) and into physical contact with the workpiece surface 110. The drilling tool 122 is forced against (e.g., pressed into, etc.) the workpiece surface 110 along the axes 120 and 124 (e.g., in the direction of the arrow 126, etc.) to provide a contact force between the drilling tool 122 and the workpiece surface 110. The rotation of the drilling tool 122 in the cutting direction and the contact force between the drilling tool 122 and the workpiece surface 110 causes the drilling tool 122 to cut (e.g., drill, etc.) into the workpiece surface 110.

The drilling end effector 106 includes a nosepiece 128 mounted to the base 116. Specifically, the nosepiece 128 extends a length from an end portion 130 to an opposite end portion 132. The end portion 130 of the nosepiece 128 is mounted to the base 116 of the drilling end effector 106 such that the nosepiece 128 at least partially surrounds the circumference of the drilling tool 122 when the drilling tool 122 is held by the chuck 118, for example as shown in FIGS. 1 and 2. As illustrated in FIGS. 1 and 2, the length of the nosepiece 128 extends along the axes 120 and 124 when the nosepiece 128 is mounted to the base 116 of the drilling end effector 106. In FIG. 1, the base 116 and nosepiece 128 are cut away such that the interiors of the base 116 and nosepiece 128 are visible to illustrate the chuck 118 and drilling tool 122.

The end portion 130 of the nosepiece 128 is rigidly mounted to the base 116 of such that the nosepiece 128 remains stationary relative to the base 116 (i.e., does not rotate about the axes 120 and 124 along with the drilling tool 122) during operation of the drilling system 100. In other words, during operation of the drilling system 100, the drilling tool 122 rotates about the axis 120 of rotation and the centerline axis 124 relative to both the base 116 and the nosepiece 128 of the drilling end effector 106. The end portion 130 of the nosepiece 128 is mounted to the base 116 using any method, means, structure, mechanism, manner, arrangement, connection, connector, device, and/or the like that enables the nosepiece 128 to function as described and/or illustrated herein, such as, but not limited to, an adhesive, an interference fit, a snap-fit, a fastener (e.g., a threaded fastener, etc.), a latch, welding, brazing, an epoxy, a clip, a ring, a cotter pin, a quick release pin, a clevis, a clevis-type connection, a bayonet-type connection, a spring override, and/or the like.

Figure 5:
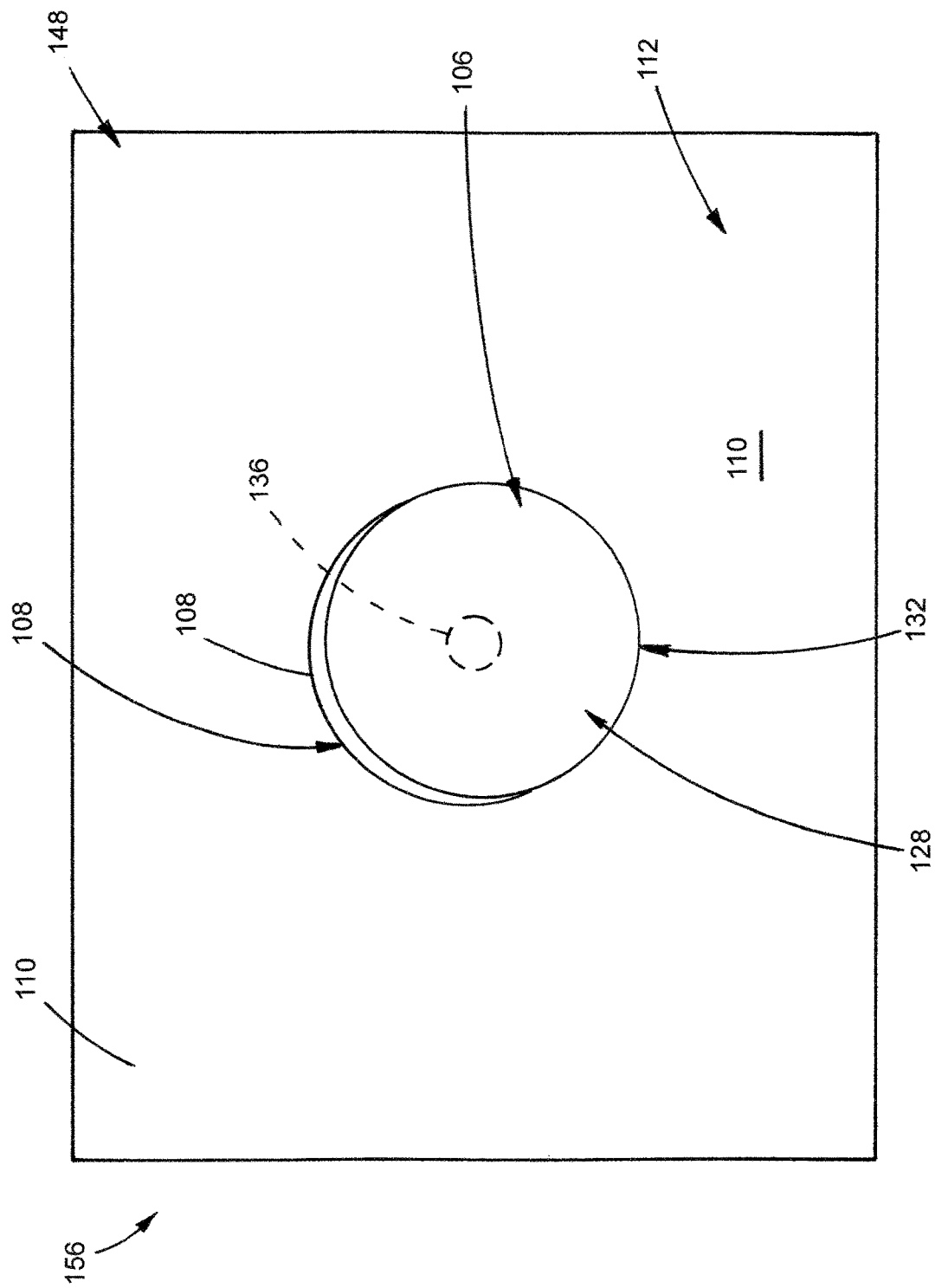
FIG. 5 is a plan view of the area of the workpiece surface shown in FIG. 4 illustrating a nosepiece of the drilling end effector misaligned with the pattern according to an implementation.
Figure 6:
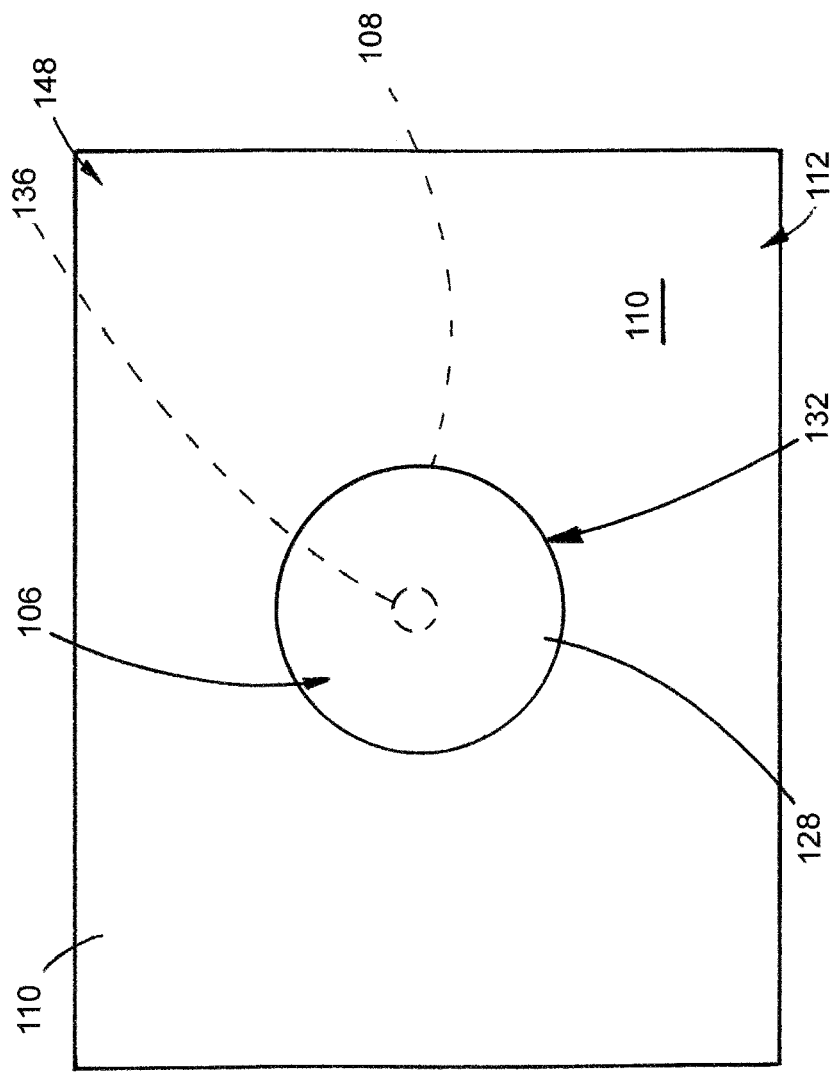
FIG. 6 is a plan view of the area of the workpiece surface shown in FIGS. 4 and 5 illustrating the nosepiece aligned with the pattern according to an implementation.

As will be described in more detail below, the end portion 132 of the nosepiece 128 is configured to be held on the workpiece surface 110 at a location wherein the centerline axis 124 of the drilling tool 122 is aligned with a target drilling location on the workpiece surface 110 (e.g., the target drilling location 136 shown in FIGS. 4-6, etc.). The end portion 132 of the nosepiece 128 includes an end surface 134 that is configured to face the workpiece surface 110 of the workpiece 112 when the end portion 132 is held on the workpiece surface 110 (e.g., during drilling of the workpiece 112, etc.). In some implementations, the end surface 134 is configured to be engaged in physical contact with the workpiece surface 110 of the workpiece 112, for example to facilitate holding the end portion 132 on the workpiece surface 110.

The nosepiece 128 includes any structure, configuration, arrangement, geometry, and/or the like that enables the nosepiece 128 to function as described and/or illustrated herein (e.g., to facilitate alignment of the drilling tool 122 with the target drilling location on the workpiece surface 110, etc.). In the implementations shown herein, the end portion 132 of the nosepiece 128 is defined by a single continuous segment that continuously surrounds (e.g., surrounds an approximate entirety of the circumference of, etc.) the drilling tool 122, as should be apparent from FIGS. 2, 5, and 6. Although shown as including a circular shape, the end portion 132 of the nosepiece 128 additionally or alternatively includes any other shape(s), such as, but not limited to, a polygonal shape, a rectangular shape, a triangular shape, a quadrilateral shape, another curved shape, an oval shape, a hexagonal shape, an octagonal shape, and/or the like.

Any other suitable structure of the end portion 132 that enables the nosepiece 128 to function as described and/or illustrated herein is contemplated to be within the scope of the present disclosure. For example, in some other implementations, the end portion 132 of the nosepiece 128 is defined by any number of discrete segments that each extends around only a portion of the circumference of the drilling tool 122 (e.g., any number of discrete legs that extend outward from the end portion 130, etc.).

In the exemplary implementations shown herein, the workpiece surface 110 is approximately planar along the area that includes the target drilling location. In other implementations wherein the area of the workpiece surface 110 that includes the target drilling location includes a 3D shape (e.g., is contoured, etc.), the end portion 132 (e.g., the end surface 134, etc.) may include a 3D shape that is complementary with the 3D shape of the area of the workpiece surface 110 that includes the target drilling location (e.g., as opposed to the approximately planar geometry of the end surface 134 of the implementations shown herein, etc.).

The nosepiece 128 optionally includes a suction tube 138 that is configured to collect chips generated during drilling operations (e.g., during drilling of the workpiece 112, etc.). The suction tube 138 is configured to be fluidly connected to a suction system (not shown) that is configured to generate suction within the suction tube 138 that enables the suction tube 138 to collect the chips.

In the implementations shown herein, the drilling platform 102 is an articulated robot arm 102a that is configured to hold the drilling end effector 106, for example on an end portion 140 of the articulated robot arm 102a, as is shown in FIGS. 1 and 2. The articulated robot arm 102a of the exemplary implementations provides a fully automated drilling system 100. For example, the articulated robot arm 102a is configured to automatically move the drilling end effector 106 to the target drilling location on the workpiece surface 110 and activate the drilling end effector 106 to drill into the workpiece 112 using the drilling tool 122. The drilling system 100 includes a control system 142 operatively connected to (e.g., using a wired and/or wireless connection, etc.), or incorporated as a component of, the articulated robot arm 102a and/or the end effector 106 for controlling the drilling system 100. For example, the control system 142 is configured to control movement of the articulated robot arm 102a, activation of the drilling end effector 106 to drill into the workpiece 112, other control functions of the drilling system 100, and/or the like.

The drilling platform 102 is not limited to the articulated robot arm 102a. Rather, additionally or alternatively the drilling system 100 includes any other type of drilling platform (whether the drilling system 100 is fully automated, semi-automated, or fully manual), such as, but not limited to, a drill press, a fixture and/or other structure (e.g., a hanging structure, a structure that mounts to the workpiece 112, a structure that is adjacent the workpiece 112, a structure that rests on and/or is attached to a floor, etc.), a gantry-style drilling platform, a post-style drilling platform, a hand-held drilling platform (e.g., a hand-held battery, electrical corded, pneumatic, or hydraulic powered drill, etc.), a less-portable drilling apparatus, and/or the like.

In some implementations, such as, but not limited to, the exemplary implementations shown herein, the chuck 118 and the drilling tool 122 held thereby move relative to the drilling platform 102 and the base 116 of the drilling end effector 106 to move the drilling tool 122 along the axes 120 and 124 toward and into physical contact with the workpiece surface 110 (e.g., in the direction of the arrow 126, etc.); and the contact force between the drilling tool 122 and the workpiece surface 110 is provided by exerting a force on the chuck 118 and thereby the drilling tool 122 to force the drilling tool 122 against the workpiece surface 110.

The drilling system 100 includes any suitable mechanism, structure, and/or the like that enables the chuck 118 and drilling tool 122 to move along the axes 120 and 124 relative to the drilling platform 102 and the base 116 of the drilling end effector 106, such as, but not limited to, a mechanical quill, a bearing, and/or the like. The movement of, and force exerted on, the chuck 118 and thereby the drilling tool 122 to move the drilling tool 122 relative to the drilling platform 102 and the base 116 toward the workpiece surface 110 and provide the contact force between the drilling tool 122 and the workpiece surface 110 is fully automated in the exemplary implementations, for example using an electrical, hydraulic, and/or pneumatic linear actuator that is controlled by the control system 142, etc. In some other implementations, the movement of, and force exerted on, the chuck 118 to move the drilling tool 122 relative to the drilling platform 102 and the base 116 toward the workpiece surface 110 and provide the contact force between the drilling tool 122 and the workpiece surface 110 is: (1) assisted (e.g., semi-automated, etc.), for example using a hydraulic cylinder, a pneumatic cylinder, a gas spring, and/or the like; or (2) fully manual, for example performed wholly by an operator directly and/or indirectly exerting a force on the drilling tool 122 (e.g., using a hand crank, a handle, a drill press, etc.), etc. In the exemplary implementations of the drilling end effector 106 shown herein, the nosepiece 128 is rigid along the length thereof to enable the drilling tool 122 to move along the length of the nosepiece 128 (i.e., relative to the length of the nosepiece 128) toward the workpiece surface 110.

Examples of fully automated implementations include the exemplary implementation of the articulated robot arm 102a shown herein, an implementation wherein the drilling platform 102 includes a drill press, gantry, or post system that includes a linear actuator (not shown) that automatically moves the drilling tool 122 relative to the base 116 of the drilling end effector 106 and automatically exerts a force on the drilling tool 122 that provides the contact force between the drilling tool 122 and the workpiece surface 110, for example upon activation by an operator and/or a control system. An example of a semi-automated implementation is an implementation wherein the drilling platform 102 is a hand-held platform that includes a linear actuator and/or other mechanism that is configured to automatically move the drilling tool 122 relative to the base 116 of the drilling end effector 106 to automatically exert a force on the drilling tool 106 that provides the contact force, for example upon activation of the by an operator holding the drilling platform 102. Examples of manual systems include an implementation wherein the drilling platform 102 is a drill press that includes a hand crank that can be manually turned by an operator to indirectly move the drilling tool 122 relative to the base 116 and indirectly exert a force on the drilling tool 122 that provides the contact force between the drilling tool 122 and the workpiece surface 110.

In some other implementations, the drilling platform 102 and the base 116 of the drilling end effector 106 are: (1) moved along the axes 120 and 124 toward the workpiece surface 110 (e.g., in the direction of the arrow 126, etc.) to thereby move the drilling tool 122 toward and into physical contact with the workpiece surface 110; and (2) a force is exerted on the base 116 of the drilling end effector 106 to force the drilling tool 122 against the workpiece surface 110 and thereby provide the contact force between the drilling tool 122 and the workpiece surface 110. The movement of, and force exerted on, the base 116 of the drilling end effector 106 to move the drilling tool 122 toward the workpiece surface 110 and provide the contact force between the drilling tool 122 and the workpiece surface 110 is: (1) fully automated in some implementations; (2) assisted in some implementations (e.g., semi-automated, etc.); and (3) fully manual (e.g., performed wholly by an operator, etc.) in some implementations. Examples of fully automated implementations include an implementation wherein an articulated robot arm (e.g., the articulated robot arm 102a, etc.) automatically moves the base 116 of the drilling end effector 106 to thereby move the drilling tool 122 toward the workpiece surface 110 and provide the contact force between the drilling tool 122 and the workpiece surface 110. Examples of manual implementations include an implementation wherein an operator holding the drilling platform 102 manually moves the drilling platform 102 and thereby the base 116 of the drilling end effector 106 to thereby move the drilling tool 122 toward the workpiece surface 110 and manually exert the force on the drilling platform 102 and the base 116 that provides the contact force between the drilling tool 122 and the workpiece surface 110. In some implementations wherein the base 116 of the drilling end effector 106 is moved to thereby move the drilling tool 122 toward the workpiece surface 110 and provide the contact force between the drilling tool 122 and the workpiece surface 110, the nosepiece 128 is collapsible (e.g., resiliently, non-resiliently, etc.) along the length thereof to enable the drilling tool 122 to extend past the end portion 132 of the nosepiece 128 while the nosepiece 128 remains held on the workpiece surface 110 during drilling operations.

In the exemplary implementations shown herein, the drilling tool 122 is a drill bit, and more specifically a twist drill bit. But, the drilling tool 122 additionally or alternatively can include any type of drill bit, such as, but not limited to, a step drill bit, an unbit drill bit, a hole saw, a center and spotting drill bit, a core drill bit, a countersink bit, an ejector drill bit, a gun drill bit, an indexable drill bit, a left-hand bit, a metal spade bit, a straight fluted bit, a trepan, a lip and spur drill bit, a wood spade bit, a spoon bit, a forstner bit, a center bit, an auger bit, a gimlet bit, a hinge sinker bit, an adjustable wood bit, a metal drill bit, a diamond core bit, a masonry drill bit, a glass drill bit, a PCB through-hole drill bit, an installer bit, a fishing bit, a flexible shaft bit, and/or the like. Moreover, the drilling tool 122 is not limited to including a drill bit. Rather, the drilling tool 122 additionally or alternatively may include any other type of drilling tool, such as, but not limited to, a tap, a die, and/or the like.

In the illustrated implementations, the workpiece 112 is an aircraft component (e.g., an internal panel, an external skin panel, etc.). But, the workpiece 112 is not limited to being an aircraft component. Rather, the drilling system implementations shown and described herein are applicable to any type of workpiece into which a drilling operation is performed, such as, but not limited to, (e.g., an automotive component, a machine component, a marine component, a space component, a panel and/or other structure of a larger assembly, and/or the like. Moreover, as briefly described above, the workpiece surface 110 is not limited to being approximately planar (e.g., having an approximately two-dimensional (2D) shape, etc.) as is shown in FIGS. 1 and 2. Rather, in addition or alternatively to being approximately planar, one or more segments of the workpiece surface 110 is has a three-dimensional (3D) shape (e.g., is contoured, etc.) in other implementations.

Figure 4:
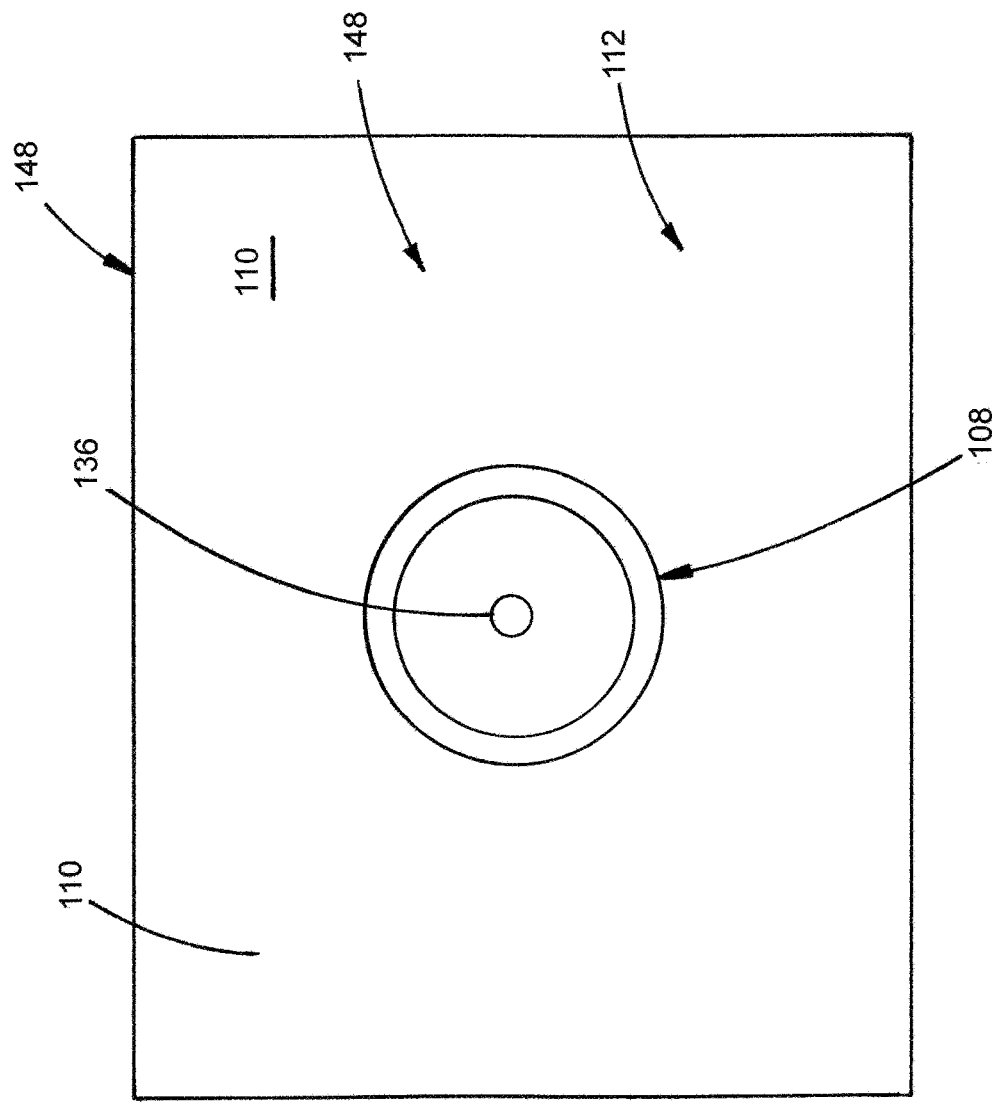
FIG. 4 illustrates a plan view of a pattern applied to a workpiece surface according to an implementation.

Referring now to FIGS. 1 and 4, as briefly described above, the pattern generator 104 (not shown in FIG. 4) of the drilling system 100 is configured to apply a pattern 108 (not visible in FIG. 1) on the workpiece surface 110. The pattern generator 104 is configured to apply the pattern 108 on the workpiece surface 110 at a reference location relative to the target drilling location 136 (not visible in FIG. 1), for example as is illustrated in FIG. 4. As will be described below, the reference location of the pattern 108 corresponds to a position of the end portion 132 (not shown in FIG. 4) of the nosepiece 128 (not shown in FIG. 4) along the workpiece surface 110 wherein the drilling tool 122 (not shown in FIG. 4) is aligned with the target drilling location 136.

The pattern generator 104 is not limited to applying the exemplary pattern 108 shown herein. Rather, the pattern generator 104 is configured to apply patterns 108 on the workpiece surface 110: (1) at any reference location relative to the target drilling location that enables the drilling system 100 to function as described and/or illustrated herein (e.g., enables the camera 114 of the drilling end effector 106 to acquire one or more images that indicate whether the drilling tool 122 is aligned with the target drilling location, etc.); and (2) patterns 108 having any geometry (e.g., sizes, shapes, orientations, etc.) that enables the drilling system 100 to function as described and/or illustrated herein (e.g., enables the camera 114 of the drilling end effector 106 to acquire one or more images that indicate whether the drilling tool 122 is aligned with the target drilling location, etc.). For example, as used herein, the phrase "at a reference location relative to a target drilling location" includes patterns 108 applied on the workpiece surface 110: (1) adjacent to the target drilling location; (2) near the target drilling location; (3) a predetermined distance from the target drilling location; (4) at least partially surrounding the target drilling location (e.g., the pattern 108 shown herein, which as shown in FIG. 4 completely surrounds the circumference of the target drilling location 136 on the workpiece surface 110, a pattern 108 that includes one or more segments that each surrounds only a portion of the circumference of the target drilling location, etc.); (5) over the target drilling location (e.g., a pattern 108 that covers an approximate entirety of the target drilling location, a pattern 108 that covers only a portion of the target drilling location, etc.); and/or the like. Moreover, in addition or alternatively to the circular and/or hollow shape of the exemplary pattern 108 shown herein, the patterns 108 applied to the workpiece surface 110 by the pattern generator 104 may include any other shape(s), such as, but not limited to, solid shapes, other hollow shapes, polygonal shapes, rectangular shapes, triangular shapes, quadrilateral shapes, other curved shapes, oval shapes, hexagonal shapes, octagonal shapes, and/or the like. Optionally, the pattern 108 includes a geometry (e.g., size, shape, orientation, etc.) that is complementary with the geometry of the end portion 132 of the nosepiece 128 (e.g., the size and circular shape of the exemplary pattern 108 shown herein is complementary with the size and circular shape of the exemplary nosepiece 128 shown herein, etc.).

Figure 3:
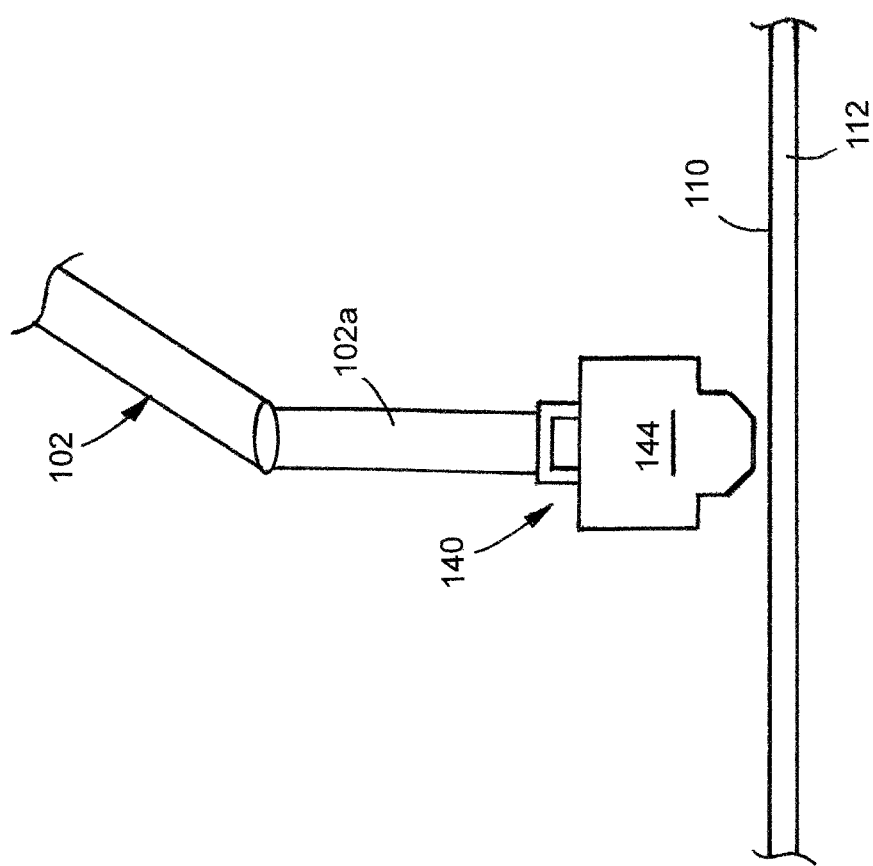
FIG. 3 is a schematic diagram illustrating a pattern end effector held by a drilling platform of the drilling system according to an implementation.

The pattern generator 104 may include any type of pattern generator that is configured to apply a pattern 108 formed from any material(s), structure, construction, and/or the like that enables the drilling system 100 to function as described and/or illustrated herein (e.g., enables the camera 114 of the drilling end effector 106 to acquire one or more images that indicate whether the drilling tool 122 is aligned with the target drilling location, etc.). For example, some implementations of the pattern generator 104 include a printer (e.g., an inkjet printer, a laser printer, a dot matrix printer, a screen printer, a device configured to fabricate a decal, etc.), a painting device (e.g., a spray painting device, a brush painting device, etc.), a writing device (e.g., a pen, a pencil, a marker, etc.), a stamp configured to stamp and thereby deposit material (e.g., ink, paint, etc.) onto the workpiece surface 110, a stamp configured to stamp the pattern 108 into the workpiece surface 110, a press configured to press and thereby deposit material (e.g., ink, paint, etc.) onto the workpiece surface 110, a press configured to press the pattern 108 into the workpiece surface 110, an etching device configured to etch the pattern 108 into the workpiece surface 110, and/or the like. Optionally, the pattern generator 104 includes a pattern end effector 144 (not shown in FIG. 4) that is configured to be held by the drilling platform 102 (e.g., the articulated robot arm 102a, etc.). The pattern end effector 144 is shown in FIG. 1 as being dismounted from the drilling platform 102 (i.e., not held by the articulated robot arm 102a. FIG. 3 illustrates the pattern end effector 144 mounted to the articulated robot arm 102a according to one implementation.

Examples of the material(s), structure, construction, and/or the like from which the pattern 108 is fabricated include, but are not limited to, ink, paint, pencil, crayon, chalk, decals, indentations, etches, and/or the like. In some implementations, the pattern 108 is removable from the workpiece surface 110 after the associated drilling operations have been completed.

In some implementations, the pattern generator 104 simultaneously fabricates and applies the pattern 108 to the workpiece surface 110. For example, in some implementations the pattern generator 104 includes a printer, a painting device, a writing device, a stamp, and/or a press that fabricates the pattern 108 respectively by printing, painting, writing, stamping, and/or pressing the pattern 108 directly onto (and/or into) the workpiece surface 110. In other implementations, the pattern generator 104 first fabricates the pattern 108 and thereafter applies the pattern 108 to the workpiece surface 110. For example, in some implementations the pattern 108 is a decal that is fabricated (e.g., printed, drawn, painted, etc.) and thereafter applied to the workpiece surface 110.

Fabrication and application of the pattern 108 to the workpiece surface 110 may be performed by the same component of the pattern generator 104. For example, implementations that include the pattern end effector 144 may utilize the pattern end effector 144 to both fabricate and apply the pattern 108 to the workpiece surface 110 (e.g., implementations wherein the pattern end effector 144 includes a printer, a painting device, a writing device, a stamp, a press, etc.). Another example includes using a component 146 (e.g., a printer, a painting device, a writing device, a stamp, a press, etc.) of the pattern generator 104 that is discrete from (i.e., separate from, external to, not configured to be held by, etc.) the drilling platform 102 to both fabricate and apply the pattern 108 to the workpiece surface 110. In some implementations, the component 146 is located within an automation cell (not shown) of the drilling platform 102 for applying the pattern 108 to the workpiece surface 110 within the automation cell prior to the drilling operation, while in other implementations the component 146 is not located within (e.g., is located external to, remotely from, etc.) an automation cell or other location of the drilling platform 102 for applying the pattern 108 to the workpiece surface 110 before the workpiece 112 is transported to the location of the drilling platform for performance of the associated drilling operation.

In some implementations, fabrication and application of the pattern 108 to the workpiece surface 110 are performed by different components (wherein the component that fabricates the pattern 108 is optionally a component of the pattern generator 104). For example, implementations that include the pattern end effector 144 may utilize the pattern end effector 144 to apply a pattern 108 (e.g. a decal, etc.) that has been fabricated by another component, such as, but not limited to, another component of the pattern generator 104 (e.g., the component 146, etc.), an external device that is not a component of the pattern generator 104, and/or the like. Another example includes using a first component of the pattern generator 104 that is discrete from (i.e., separate from, external to, not configured to be held by, etc.) the drilling platform 102 (e.g., the component 146, etc.) to apply a pattern 108 that has been fabricated by another component, such as, but not limited to, another component of the pattern generator 104 (e.g., the component 146, etc.), an external device that is not a component of the pattern generator 104, and/or the like.

It should be understood from the above examples that in some implementations the pattern 108 is fabricated by the pattern generator, while in other implementations fabrication of the pattern 108 is not performed by the pattern generator 104. For example, in some implementations, the pattern generator 104 applies a pattern 108 to the workpiece surface 110 that has been previously fabricated by an external device that is not a component of the pattern generator 104.

Fabrication and application of the pattern 108 to the workpiece surface 110 is: (1) fully automated in some implementations; (2) assisted in some implementations (e.g., semi-automated, etc.); and (3) fully manual (e.g., performed wholly by an operator, etc.) in some implementations. One example of a fully automated processes is the drilling platform 102 automatically fabricating and applying the pattern 108 to the workpiece surface 110 using the pattern end effector 144. Another example of a fully automated process is the drilling platform automatically using the pattern end effector 144 to apply a pattern 108 (e.g. a decal, etc.) that has been automatically fabricated by another component, such as, but not limited to, another component of the pattern generator 104 (e.g., the component 146, etc.), an external device that is not a component of the pattern generator 104, and/or the like. Still another fully automated example includes using the component 146 (e.g., a printer, a painting device, a writing device, a stamp, a press, etc.) of the pattern generator 104 to both automatically fabricate and apply the pattern 108 to the workpiece surface 110. Yet another fully automated example includes using the component 146 to automatically apply a pattern 108 that has been automatically fabricated by another component, such as, but not limited to, another component of the pattern generator 104, an external device that is not a component of the pattern generator 104, and/or the like.

Examples of assisted processes of fabricating and applying the pattern 108 include an operator manually applying a pattern 108 (e.g. a decal, etc.) that has been automatically fabricated by another component, such as, but not limited to, another component of the pattern generator 104 (e.g., the component 146, etc.), an external device that is not a component of the pattern generator 104, and/or the like. Another example of an assisted process is automatically applying a pattern 108 (e.g., a decal, etc.) that has been manually fabricated (e.g., drawn, painted, stenciled, printed, etc.) by an operator using another component, such as, but not limited to, another component of the pattern generator 104 (e.g., the component 146, etc.), an external device that is not a component of the pattern generator 104, and/or the like. It should be understood from the above examples that in some implementations the pattern generator 104 includes a human operator.

An example of a fully manual process for fabricating and applying the pattern 108 includes an operator manually fabricating and applying the pattern 108 to the workpiece surface 110, for example by: (1) drawing, painting, spraying, stenciling, printing, stamping, pressing, and/or the like the pattern 108 on the workpiece surface 110; (2) carving, etching, scratching, stamping, pressing, and/or the like the pattern 108 into the workpiece surface 110; (3) by applying (e.g., adhering, etc.) a decal to the workpiece surface 110; and/or the like.

In some implementations that include the pattern end effector 144, the drilling end effector 106 and the pattern end effector 144 may be configured to be releasably held by the drilling platform 102 (e.g., by the articulated robot arm 102a, etc.) such that each of the end effectors 106 and 144 can be selectively secured to and removed from the drilling end effector 106, for example to enable the drilling platform 102 to cycle between applying the pattern 108 to the workpiece surface 110 using the pattern end effector 144 and performing a drilling operation on the workpiece surface 110 using the drilling end effector 106. In addition or alternatively to being releasably held by the drilling platform 102, some implementations of the drilling platform 102 include a fixture (not shown) that is capable of simultaneously holding both end effectors 106 and 144 and is configured to move (e.g., rotate, slide or otherwise move linearly, etc.) to enable the drilling platform to cycle between drilling and pattern operations performed using the drilling end effector 106 and the pattern end effector 144, respectively.

Referring again to FIGS. 1 and 2, in some implementations the drilling system 100 includes one or more cameras 114. In the exemplary implementations, each camera 114 is mounted to the base 116 of the drilling end effector 106. Each camera 114 is configured to acquire images of an area (e.g., the area 148 shown in FIGS. 4-6, etc.) of the workpiece surface 110 that includes the pattern 108 (shown in FIGS. 4 and 5) when the end portion 132 of the nosepiece 128 held on the workpiece surface 110. For example, the camera 114 is configured such that when the end portion 132 of the nosepiece 128 is held on the workpiece surface 110 at a location wherein the target drilling location 136 (shown in FIGS. 4-6) is in view of the camera 114, the camera 114 acquires one or more images of an area (e.g., the area 148, etc.) that includes both the pattern 108 and the target drilling location 136. As will be described in more detail below, the images acquired by the camera 114 indicate whether the end portion 132 of the nosepiece 128 of the drilling end effector 106 is aligned with the pattern 108 on the workpiece surface 110 such that the drilling tool 122 is aligned with the target drilling location 136.

Each camera 114 is configured to acquire any type(s) of image, such as, but not limited to, still images, video images, real-time images, delayed images, visible light images, night vision images, and/or like. For example, in one exemplary implementation, one or more cameras 114 is configured to acquire real-time video of the area that includes both the pattern 108 and the target drilling location 136. Each camera 114 is any type of camera 114 that enables the camera 114 to function as described and/or illustrated herein (e.g., to acquire images of an area of the workpiece surface 110 that includes both the pattern 108 and the target drilling location 136, etc.). Examples of the camera 114 include, but are not limited to, a still image camera, a video camera, a digital camera, a night vision camera, a visible light camera, a lipstick camera, and/or the like. Although shown as including a single camera 114 in FIG. 1 and two cameras 114 in FIG. 2, in other implementations the drilling end effector 106 includes any other number of cameras 114.

As described above, in the exemplary implementations shown herein, each camera 114 is mounted to the base 116 of the drilling end effector 106. In some other implementations, one or more cameras 114 additionally or alternatively is mounted to the nosepiece 128, the chuck 118, and/or another component of the drilling end effector 106. Moreover, in some implementations, one or more of the cameras 114 is discrete from (i.e., separate from, external to, not mounted to, etc.) the drilling end effector 106 (e.g., one or more of the cameras 114 is mounted to the drilling platform 102, a floor, a wall, a ceiling, a fixture or other support structure, within an automation cell or at another location that includes the drilling platform, etc.).

Each camera 114 is mounted at any position (e.g., location, orientation, alignment, angle, etc.) that enables the camera 114 to function as described and/or illustrated herein (e.g., to acquire images that indicate whether the end portion 132 of the nosepiece 128 of the drilling end effector 106 is aligned with the pattern 108 on the workpiece surface 110, etc.). In the exemplary implementations shown herein, the images of the area 148 (shown in FIGS. 4-6) acquired by the camera(s) 114 are plan views (e.g., bird's eye views, etc.), but the camera(s) are not limited to acquiring plan view. Rather, each camera 114 may acquire images from any view(s) (e.g., from any perspective(s), etc.) that enable the camera 114 to function as described and/or illustrated herein (e.g., to acquire images that indicate whether the end portion 132 of the nosepiece 128 of the drilling end effector 106 is aligned with the pattern 108 on the workpiece surface 110, etc.). For example, in some implementations one or more cameras 114 is configured to acquire images of the area 148 (shown in FIGS. 4-6) from one or more side views.

Each camera 114 is mounted using any method, means, structure, mechanism, manner, arrangement, connection, connector, device, and/or the like that enables the camera 114 to function as described and/or illustrated herein (e.g., to acquire images that indicate whether the end portion 132 of the nosepiece 128 of the drilling end effector 106 is aligned with the pattern 108 on the workpiece surface 110, etc.). Examples of methods, means, structures, mechanisms, manners, arrangements, connections, connectors, devices, and/or the like that are used in some implementations to mount one or more of the cameras 114 include, but are not limited to: an adhesive; an interference fit; a snap-fit; a fastener (e.g., a threaded fastener, etc.); a latch; welding; brazing; an epoxy; a clip; a ring; a cotter pin; a quick release pin; a clevis; a clevis-type connection; a bayonet-type connection; a spring override; being built into the base 116, the chuck 118, and/or the nosepiece 128; and/or the like.

In some implementations, one or more parameters of one or more of the cameras 114 is selectable, for example to enable calibration of the camera 114. In other words, one or more parameters of one or more of the cameras 114 can be adjusted, changed, and/or the like (e.g., by a user, a technician, etc.) in some implementations, for example to configure the camera 114 to acquire images of an area of the workpiece surface 110 (e.g., the area 148, etc.) that includes both the target drilling location 112 and the pattern 108. Examples of parameters of one or more cameras 114 that are selected in some implementations include, but are not limited to, the position (e.g., location, orientation, alignment, angle, etc.) of the camera 114, the speed of the camera 114, the type of images (e.g., still images, video images, real-time images, delayed images, visible light images, night vision images, etc.) acquired by the camera, a delay of images acquired by the camera 114, and/or the like.

Referring now solely to FIG. 1, in implementations that include one or more cameras 114, optionally each camera 114 is operatively connected to one or more optional displays 150 of the drilling system 100 and/or one or more external displays 152 (described below) such that the camera 114 is configured to send the images acquired thereby to the display(s) 150 and/or the display(s) 152 for viewing by an operator of the drilling system 100. For example, in some implementations the drilling platform 102, the drilling end effector 106, and/or the control system 142 includes one or more displays 150. In the exemplary implementation, the display 150 is built into an optional user interface 154 of the control system 142. In addition or alternatively, one or more displays 150 is built into the drilling platform 102 and/or the drilling end effector 106 in some implementations. Moreover, in some implementations, one or more displays 150 is an external attachment that is mounted to the control system 142, the drilling platform 102, the drilling end effector 106, and/or a support structure (e.g., a fixture, a floor, a wall, a ceiling, a table, a cart, etc.) of an automation cell or another location that includes the drilling platform 102, a control room (not shown), and/or the like. Any displays 150 that are external attachments are optionally mounted to the control system 142, the drilling platform 102, the drilling end effector 106, and/or a support structure in a configuration such that the position of the display 150 is configured to be adjusted by an operator of the drilling system 100 (e.g., using a telescoping arm; an articulating arm; a bending arm; a hinge; a fixture that enables tilt, swivel, and/or rotation; etc.).

The display 150 of the drilling system 100 described above and illustrated in FIG. 1 is a dedicated display. In other words, the display 150 is dedicated to displaying images acquired by one or more of the cameras 114 of the drilling system 100. In addition or alternatively to the drilling system 100 including one or more displays 150, optionally one or more of the cameras 114 of the drilling system 100 is configured to be operatively connected to one or more external displays 152 that is not a component of the drilling system 100. In other words, in some implementations one or more of the cameras 114 is configured to be operatively connected to one or more external displays 152 that is not dedicated to merely displaying images acquired by the camera(s) 114 of the drilling system 100. Examples of the external display 152 include, but are not limited to, a television, a display panel, a computer monitor, a smartphone, a headset, a virtual reality headset, an augmented reality headset, virtual reality glasses, augmented reality glasses, Google Glass, a hand held screen, a tablet and/or other mobile device, and/or the like.

Each display 150 and 152 is operatively connected to the corresponding camera(s) 114 of the drilling system 100 using any wireless operative connection and/or any wired operative connection that enables (e.g., configures, etc.) the display 150 or 152 to receive and display images acquired by the corresponding camera(s) 114. Examples of wired operative connections that enable the displays 150 and 152 to receive and display images acquired by the corresponding camera(s) 114 include, but are not limited to, one or more electrical cables, one or more electrical wires, one or more optical cables, a wired connection to a local area network (LAN), a wired connection to a wide area network (WAN), a wired connection to the Internet, and/or the like. Examples of wireless operative connections that enable the displays 150 and 152 to receive and display images acquired by the corresponding camera(s) 114 include, but are not limited to, a Wi-Fi™ network, Bluetooth®, a wireless LAN (WLAN), a wireless WAN (WWAN), a wireless connection to the Internet, and/or the like.

Each display 150 and 152 is any type of display that enables the display 150 or 152 to function as described and/or illustrated herein (e.g., to display images acquired by the corresponding camera 114, etc.), such as, but not limited to, a plasma display, a liquid crystal display (LCD), a light emitting diode (LED) display, a cathode ray tube (CRT) display, a projection display, an organic light-emitting diode (OLED) display, and/or the like. Although shown has including only a single display 150 and a single display 152, in other implementations any other number of displays 150 and any other number of displays 152 is be provided.

Optionally, the nosepiece 128 includes one or more strain gauges (not shown) configured to measure a load exerted on the end portion 132 of the nosepiece 128 by a contact force between the end surface 134 of the nosepiece 128 and the workpiece surface 110. Specifically, each strain gauge is configured to measure the load exerted on the nosepiece 128 by the contact force between the end surface 134 and the workpiece surface 110 at the location of the strain gauge. Accordingly, the load measured by each strain gauge indicates the amount of contact force that the end surface 134 of the nosepiece 128 is applying to the workpiece surface 110 at the location of the strain gauge. Each strain gauge measures the load exerted on the nosepiece 128 at the location of the strain gauge in any units, such as, but not limited to, pounds (lbs.), kilograms (kgs.), and/or the like.

In some implementations, one or more of the cameras 114, one or more of the displays 150, and/or one or more of the displays 152 is configured such that one or more displays 150 and/or one or more displays 152 is configured to display the load measured by the strain gauge(s). In implementations wherein the nosepiece 128 includes more than one strain gauge, the display(s) 150 and/or the display(s) 152 may display the load measured by each strain gauge individually and/or may display an average of the measurements of two or more of the strain gauges. The nosepiece 128 may include any number of the strain gauges. Each strain gauge is mounted to the nosepiece 128 at any position (e.g., location, orientation, alignment, angle, etc.) and using any method, means, structure, mechanism, manner, arrangement, connection, connector, device, and/or the like that enables the strain gauge to function as described and/or illustrated herein (e.g., to measure a load that indicates the amount of contact force that the end surface 134 is applying to the workpiece surface 110 at the location of the strain gauge, etc.).

In operation, the end portion 132 of the nosepiece 128 of the drilling end effector 106 is positioned on the workpiece surface 110 of the workpiece 112 over the target drilling location 136. In the exemplary implementations shown herein, the control system 142 automatically commands the articulated robot arm 102*a* to automatically position and hold the end portion 132 of the nosepiece 128 on the workpiece surface 110 over the target drilling location 136. In other implementations, another type of fully automated drilling system or a semi-automated drilling system automatically positions and holds the end portion 132 of the nosepiece 128 on the workpiece surface 110 over the target drilling location 136. In still other implementations, an operator manually positions the end portion 132 of the nosepiece 128 on the workpiece surface 110 over the target drilling location 136.

In the exemplary implementation shown herein, the end surface 134 of the nosepiece 128 is engaged in physical contact with the workpiece surface 110 when the end portion 132 of the nosepiece 128 is held on the workpiece surface 110 over the target drilling location 136 (e.g., as shown in FIG. 1, etc.), for example to facilitate orienting the drilling tool 122 relative to the workpiece surface 110, to facilitate holding the end portion 132 of the nosepiece 128 on the workpiece surface 100, etc.

Once the nosepiece 128 has been positioned on the workpiece surface 110 over the target drilling location 136, one or more images acquired by the camera(s) 114 is analyzed (e.g., viewed; data, signals, and/or the like that represents the image(s) is accessed; etc.) to determine whether the end portion 132 of the nosepiece 128 is aligned (e.g., approximately aligned, precisely aligned, etc.) with the pattern 108 on the workpiece surface 110. In the exemplary implementations shown herein, the control system 142 automatically analyzes the image(s) acquired by the camera(s) 114 to determine whether the end portion 132 of the nosepiece 128 is aligned with the pattern 108 on the workpiece surface 110. In addition or alternatively, the image(s) acquired by the camera(s) 114 is automatically analyzed by another device (e.g., a camera 114, another control system, the pattern generator 104, etc.) and/or is manually analyzed by an operator viewing the image(s) on one or more of the optional displays 150 and/or 152. In addition or alternative to analyzing the image(s) acquired by the camera(s) 114, an operator may view the area 148 of the workpiece surface 110 that includes the pattern 108 and the target drilling location 138 through a direct line of sight or an indirect line of sight (e.g., provided by one or more mirrors, reflectors, etc.) to determine whether the end portion 132 of the nosepiece 128 is aligned with the pattern 108 on the workpiece surface 110. The optional displays 150 and 152 and the optional line of sight also enable an operator to observe the area 148 that includes the pattern 108 and the target drilling location 136 during the various positioning, alignment, and drilling operations of the drilling system 100.

Any relative position (e.g., location, orientation, etc.) between the pattern 108 and the end portion 132 of the nosepiece 128 along the workpiece surface 110 can be used to determine whether the end portion 132 of the nosepiece 128 is aligned with the pattern 108 (whether the relative position is obtained from image(s) acquired by the camera(s) 114 or by an operator through line of sight). Examples of relative positions between the pattern 108 and the end portion 132 of the nosepiece 128 that can be used to determine whether the end portion 132 is aligned with the pattern 108 include, but are not limited to: whether the pattern 108 is visible when the end portion 132 of the nosepiece 128 is held on the workpiece surface 110 over the target drilling location 136; whether an edge, segment, and/or other geometry of the end portion 132 lines up with an edge, segment, and/or other geometry of the pattern 108; and/or the like.

In the exemplary implementations shown herein, the end portion 132 of the nosepiece 128 is determined as misaligned (e.g., not approximately aligned, not precisely aligned, etc.) with the pattern 108 when the pattern 108 is visible in the image(s) acquired by the camera(s) 114. For example, FIG. 5 illustrates an exemplary implementation of an image 156 of the area 148 acquired by the camera(s) 114 that illustrates the end portion 132 of the nosepiece 128 misaligned with the pattern according to one implementation. As can be seen in FIG. 5, the pattern 108 is visible in the image 156, thereby indicating that the end portion 132 of the nosepiece 128 is misaligned with the pattern 108.

In the exemplary implementations shown herein, the end portion 132 of the nosepiece 128 is determined to be aligned with the pattern 108 when the end portion 132 covers the pattern 108 such that the pattern 108 is not visible in the image(s) acquired by the camera(s) 114. For example, FIG. 6 illustrates an exemplary implementation of an image 158 of the area 148 acquired by the camera(s) 114 that illustrates the end portion 132 of the nosepiece 128 aligned with the pattern according to one implementation. As can be seen in FIG. 6, the pattern 108 is not visible in the image 158, thereby indicating that the end portion 132 of the nosepiece 128 is aligned with the pattern 108.

A determination that the end portion 132 of the nosepiece 128 is aligned with the pattern 108 indicates that the drilling tool 122 is aligned (e.g., approximately aligned, precisely aligned, etc.) with the target drilling location 136. Accordingly, the drilling end effector 106 is activated to drill into the workpiece surface 110 at the target drilling location 136 upon a determination that the end portion 132 of the nosepiece 128 is aligned with the pattern 108 on the workpiece surface 110.

A determination that the end portion 132 of the nosepiece 128 is misaligned with the pattern 108 indicates that the drilling tool 122 is misaligned (e.g., not approximately aligned, not precisely aligned, etc.) with the target drilling location 136. Accordingly, upon a determination that the end portion 132 of the nosepiece 128 is misaligned with the pattern 108, the end portion 132 of the nosepiece 128 is adjustably aligned (e.g., approximately aligned, precisely aligned, etc.) with the pattern 108 on the workpiece surface 110 by moving the drilling end effector relative to the workpiece surface 110 (e.g., along the length and/or width of the workpiece surface 110, etc.). In the exemplary implementations shown herein, the control system 142 automatically commands the articulated robot arm 102a to automatically move the drilling end effector 106 relative to the workpiece surface 110 to thereby automatically adjustably align the end portion 132 of the nosepiece 128 with the pattern 108 on the workpiece surface 110. In some other implementations, the end portion 132 of the nosepiece 128 is manually moved by an operator to manually adjustably align the end portion 132 of the nosepiece 128 with the pattern 108 on the workpiece surface 110.

The optional displays 150 and 152 and the optional line of sight of an operator enables the operator to observe the area 148 that includes the pattern 108 and the target drilling location 136 during the various positioning, alignment, and drilling operations of the drilling system 100. In some examples, the area 148 is analyzed (e.g., using the image(s) acquired by the camera(s) 114, by an operator viewing the area 148 through a line of sight, etc.) during a drilling operation (e.g., drilling into the workpiece surface 110 at the target drilling location 136 using the drilling tool 122, etc.) to determine and correct for any movement of the end portion 132 of the nosepiece 128 out of alignment with the pattern 108, for example caused by the drilling tool 102 "walking" along the workpiece surface 110 away from the target drilling location 136, caused by movement of the drilling platform, and/or the like.

Figure 7:
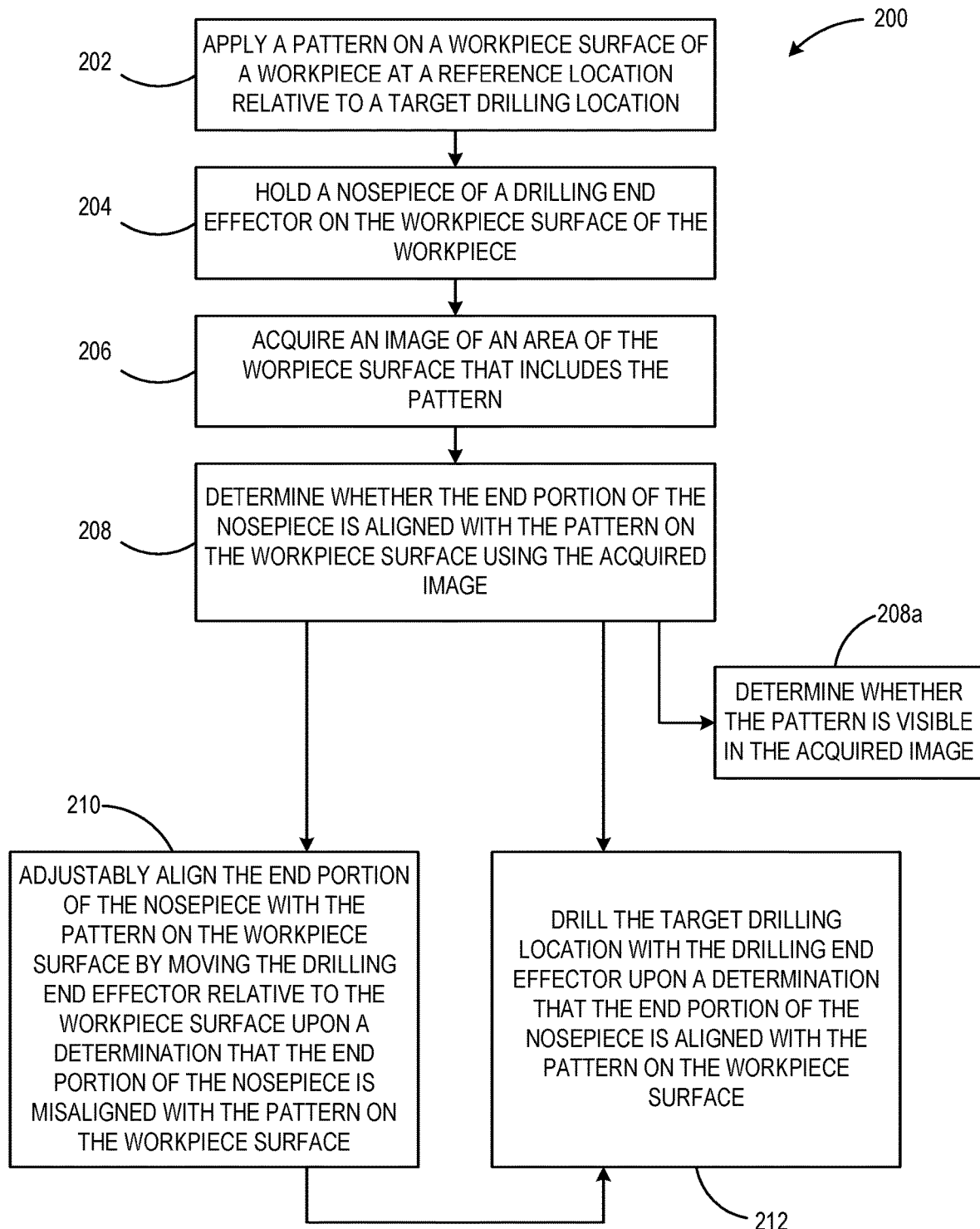
FIG. 7 is a flow chart illustrating a method for drilling a workpiece according to an implementation.

FIG. 7 is a flow chart illustrating a method 200 for drilling a workpiece according to an implementation. The method 200 includes applying, at 202, a pattern on a workpiece surface of the workpiece at a reference location relative to a target drilling location. At 204, the method 200 includes holding a nosepiece of a drilling end effector on the workpiece surface of the workpiece. At 206, the method 200 includes acquiring an image of an area of the workpiece surface that includes the pattern. The method 200 further includes determining, at 208, whether the end portion of the nosepiece is aligned with the pattern on the workpiece surface using the acquired image. In some implementations, determining at 208 whether the end portion of the nosepiece is aligned with the pattern on the workpiece surface using the acquired image includes determining, at 208a, whether the pattern is visible in the acquired image.

The method 200 further includes adjustably aligning, at 210, the end portion of the nosepiece with the pattern on the workpiece surface by moving the drilling end effector relative to the workpiece surface upon a determination that the end portion of the nosepiece is misaligned with the pattern on the workpiece surface. At 212, the method 200 includes drilling the target drilling location with the drilling end effector upon a determination that the end portion of the nosepiece is aligned with the pattern on the workpiece surface.

Certain implementations of the present disclosure provide a drilling end effector for drilling a workpiece having a workpiece surface. The drilling end effector includes a chuck configured to hold a drilling tool, and a nosepiece configured to at least partially surround the drilling tool when the drilling tool is held by the chuck. The nosepiece includes an end portion. The nosepiece includes at least one suction cup and at least one suction feed line. The at least one suction cup is fluidly connected to the at least one suction feed line. The at least one suction feed line is configured to be fluidly connected to a suction system. The at least one suction cup is configured to be engaged in physical contact with the workpiece surface and pulled under suction by the suction system such that the at least one suction cup adheres to the workpiece surface to thereby hold the end portion of the nosepiece on the workpiece surface.

Certain implementations of the present disclosure facilitate aligning a drilling tool with a target drilling location on a workpiece surface. Certain implementations of the present disclosure facilitate preventing movement (e.g., sliding, skidding, skating, etc.) of the drilling tool away from the target drilling location on the workpiece surface, for example before and/or during the performance of a drilling operation on the workpiece.

Certain implementations of the present disclosure reduce the occurrence of openings being drilled at inaccurate locations (e.g., an opening misaligned with the target drilling location, etc.) on the workpiece surface. Certain implementations of the present disclosure reduce damage (e.g., scratches, scrapes, gashes, etc.) caused to the workpiece and/or other structures (e.g., attaching substructure, etc.) resulting from the drilling tool moving along the workpiece surface. Certain implementations of the present disclosure reduce the number of broken drilling tools resulting from repeated drilling operations. Certain implementations of the present disclosure facilitate detecting, preventing, reducing, and/or correcting for movement (e.g., sliding, skidding, skating, etc.) of a drilling tool away from the target drilling location without increasing the cost and/or complexity of one or more components (e.g., an articulated robot arm, a drilling end effector, the automation cell in which a drilling operation is performed, a control system, etc.) of the drilling system.

Figure 8:
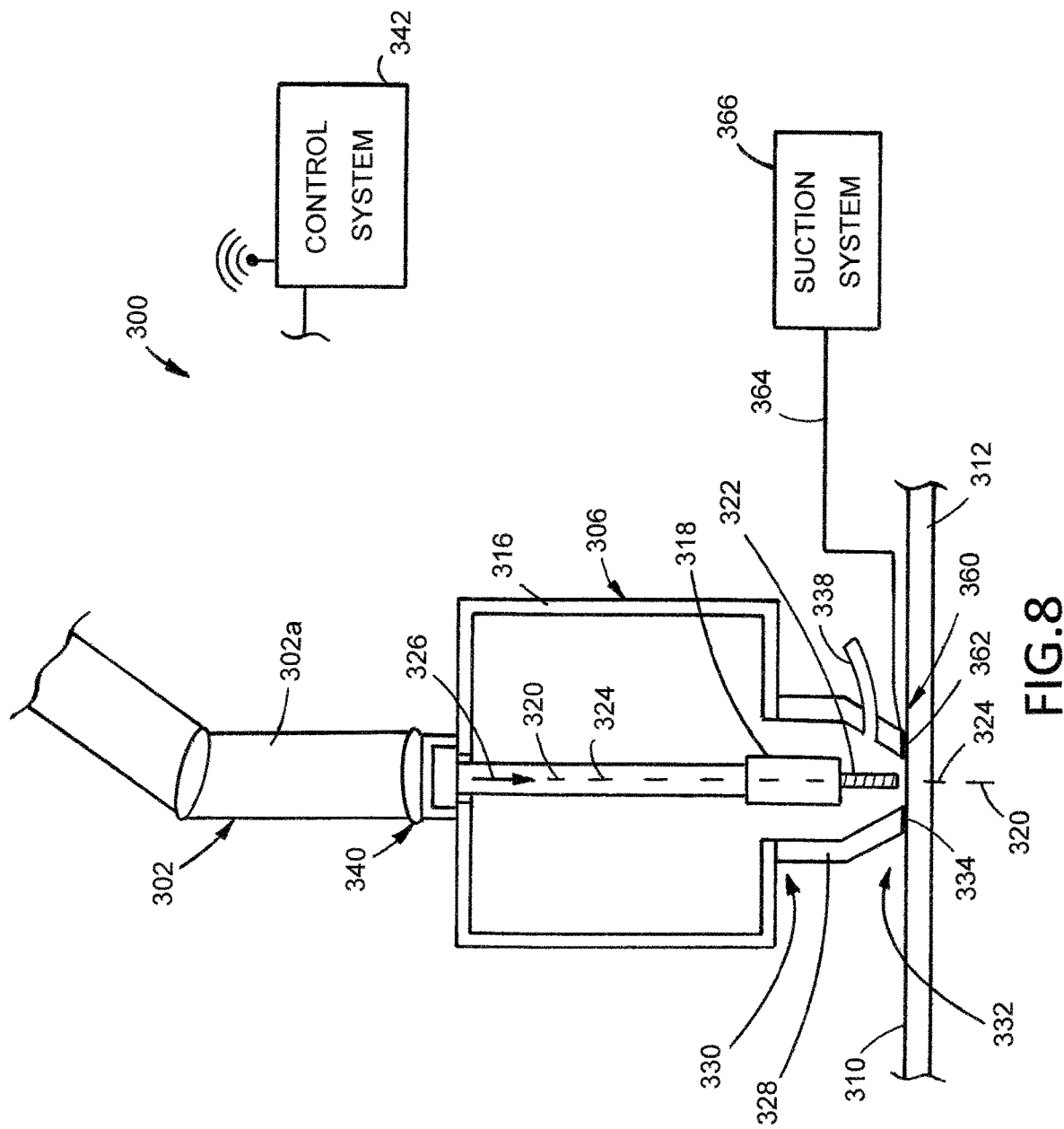
FIG. 8 is a schematic diagram illustrating a drilling system according to an implementation.

Another exemplary implementation of a drilling end effector 306 is illustrated in FIGS. 8-14. Referring now to FIG. 8, a drilling system 300 includes a drilling platform 302 and a drilling end effector 306. As will be described in more detail below, a nosepiece 328 of the drilling end effector 306 includes a suction clamp 360 that is configured to hold the nosepiece 328 to a workpiece surface 310 of a workpiece 312.

Figure 9:
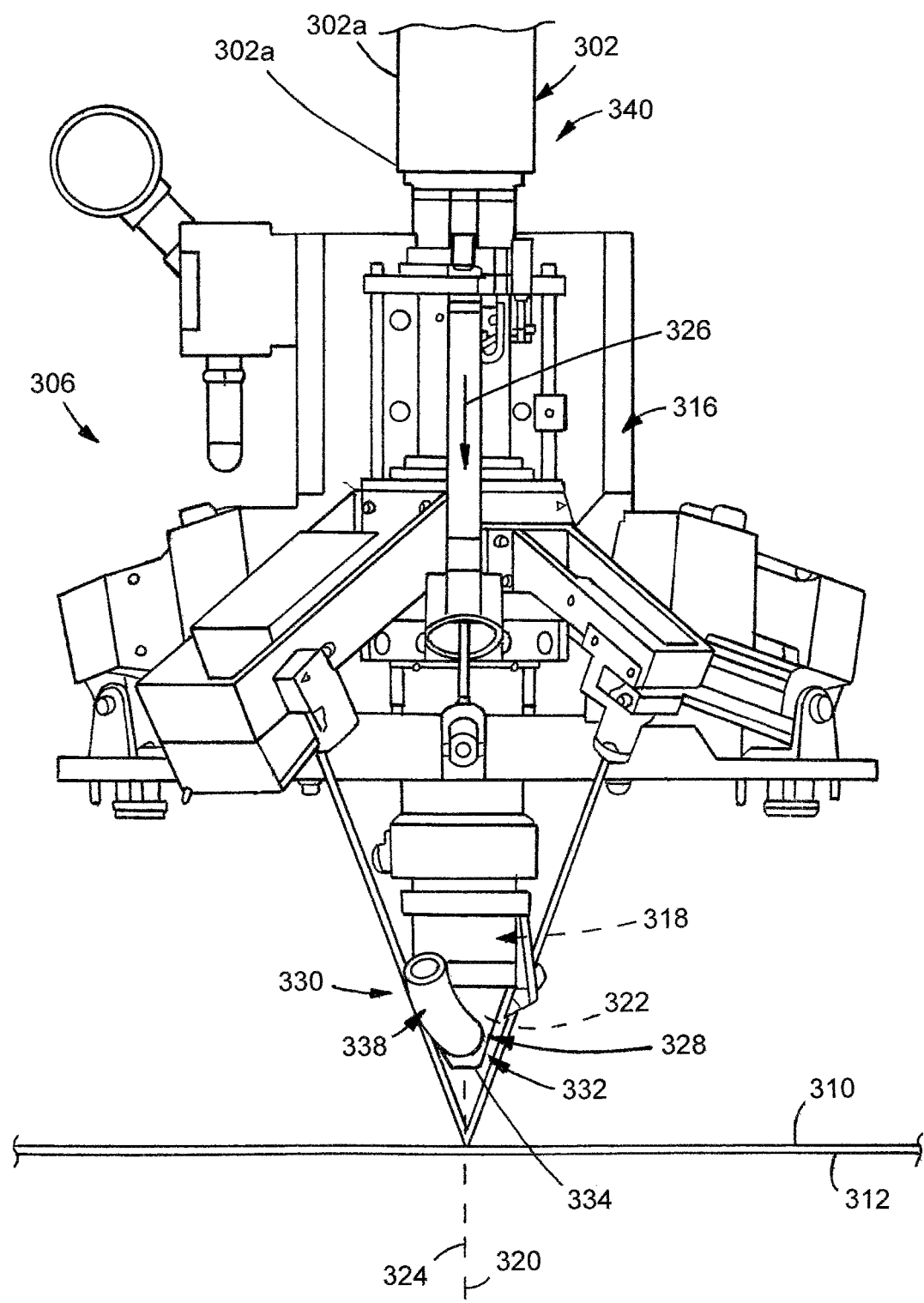
FIG. 9 is a perspective view of a portion of the drilling system shown in FIG. 8 illustrating a drilling end effector according to an implementation.

Referring now to FIGS. 8 and 9, the drilling end effector 306 includes a base 316 and a chuck 318. The base 316 of the drilling end effector 306 is configured to be held by the drilling platform 302. The chuck 318 is held by the base 316 such that the chuck 318 is configured to rotate relative to the base 316 about an axis 320 of rotation during operation (e.g., drilling of the workpiece 312, etc.) of the drilling system 300. The drilling end effector 306 includes any suitable driving mechanism (not shown) operatively connected to the chuck 318 for driving rotation of the chuck 318 about the axis 320 of rotation (i.e., for exerting a torque on the chuck 318 that rotates the chuck 318 about the axis 320 of rotation), such as, but not limited to, an electric motor, a hand crank, a combustion engine, and/or the like. The chuck 318 is not visible in FIG. 9.

The chuck 318 is configured to hold a drilling tool 322 such that the axis 320 of rotation of the chuck 318 is aligned with a centerline axis 324 of the drilling tool 322. The drilling tool 322 is secured to the chuck 318 such that the drilling tool 322 is configured to rotate along with the chuck 318 about the axis 320 of rotation and about the centerline axis 324. Specifically, the drilling tool 322 can be rigidly secured to the chuck 318 such that the chuck 318 translates the torque provided by the driving mechanism to the drilling tool 322 to thereby rotate the drilling tool 322 about the axis of rotation 320 and the centerline axis 324. In some examples, the chuck 318 is configured to releasably hold the drilling tool 322 such that the drilling tool 322 can be selectively secured to and removed from the drilling end effector 306, for example for repair or replacement of the drilling tool 322, and/or for servicing, storing, moving, maintaining and/or the like of the drilling end effector 306. The drilling tool 322 is not visible in FIG. 9.

In operation of the drilling end effector 306 to drill into the workpiece surface 310, the drilling tool 322 is rotated about the axes 320 and 324 in a cutting direction (e.g., clockwise, counter-clockwise, etc.) that enables the drilling tool 322 is cut into the workpiece surface 310. As the drilling tool 322 is rotated about the axes 320 and 324 in the cutting direction, the drilling tool 322 is moved along the axes 320 and 324 toward (e.g., in the direction of the arrow 326, etc.) and into physical contact with the workpiece surface 310. The drilling tool 322 is forced against (e.g., pressed into, etc.) the workpiece surface 310 along the axes 320 and 324 (e.g., in the direction of the arrow 326, etc.) to provide a contact force between the drilling tool 322 and the workpiece surface 310. The rotation of the drilling tool 322 in the cutting direction and the contact force between the drilling tool 322 and the workpiece surface 310 causes the drilling tool 322 to cut (e.g., drill, etc.) into the workpiece surface 310.

The drilling end effector 306 includes the nosepiece 328, which is mounted to the base 316. The nosepiece 328 extends a length from an end portion 330 to an opposite end portion 332. The end portion 330 of the nosepiece 328 is mounted to the base 316 of the drilling end effector 306 such that the nosepiece 328 at least partially surrounds the circumference of the drilling tool 322 when the drilling tool 322 is held by the chuck 318, for example as shown in FIGS. 8 and 9. As illustrated in FIGS. 8 and 9, the length of the nosepiece 328 extends along the axes 320 and 324 when the nosepiece 328 is mounted to the base 316 of the drilling end effector 306. In FIG. 8, the base 316 and nosepiece 328 are cut away such that the interiors of the base 316 and nosepiece 328 are visible to illustrate the chuck 318 and drilling tool 322.

The end portion 330 of the nosepiece 328 is rigidly mounted to the base 316 of such that the nosepiece 328 remains stationary relative to the base 316 (i.e., does not rotate about the axes 320 and 324 along with the drilling tool 322) during operation of the drilling system 300. In other words, during operation of the drilling system 300, the drilling tool 322 rotates about the axis 320 of rotation and the centerline axis 324 relative to both the base 316 and the nosepiece 328 of the drilling end effector 306. The end portion 330 of the nosepiece 328 is mounted to the base 316 using any method, means, structure, mechanism, manner, arrangement, connection, connector, device, and/or the like that enables the nosepiece 328 to function as described and/or illustrated herein, such as, but not limited to, an adhesive, an interference fit, a snap-fit, a fastener (e.g., a threaded fastener, etc.), a latch, welding, brazing, an epoxy, a clip, a ring, a cotter pin, a quick release pin, a clevis, a clevis-type connection, a bayonet-type connection, a spring override, and/or the like.

The end portion 332 of the nosepiece 328 is configured to be held on the workpiece surface 310 at a location wherein the centerline axis 324 of the drilling tool 322 is aligned with a target drilling location on the workpiece surface 310. The end portion 332 of the nosepiece 328 includes an end surface 334 that is configured to face the workpiece surface 310 of the workpiece 312 when the end portion 332 is held on the workpiece surface 310 (e.g., during drilling of the workpiece 312, etc.). In some implementations, the end surface 334 is configured to be engaged in physical contact with the workpiece surface 310 of the workpiece 312, for example to facilitate holding the end portion 332 on the workpiece surface 310.

The nosepiece 328 includes any structure, configuration, arrangement, geometry, and/or the like that enables the nosepiece 328 to function as described and/or illustrated herein (e.g., to facilitate alignment of the drilling tool 322 with the target drilling location on the workpiece surface 310, etc.). In the implementations shown herein, the end portion 332 of the nosepiece 328 is defined by a single continuous segment that continuously surrounds (e.g., surrounds an approximate entirety of the circumference of, etc.) the drilling tool 322, as should be apparent from FIGS. 9 and 10. Although shown as including a circular shape, the end portion 332 of the nosepiece 328 additionally or alternatively includes any other shape(s), such as, but not limited to, a polygonal shape, a rectangular shape, a triangular shape, a quadrilateral shape, another curved shape, an oval shape, a hexagonal shape, an octagonal shape, and/or the like.

Any other suitable structure of the end portion 332 that enables the nosepiece 328 to function as described and/or illustrated herein is contemplated to be within the scope of the present disclosure. For example, in some other implementations, the end portion 332 of the nosepiece 328 is defined by any number of discrete segments that each extends around only a portion of the circumference of the drilling tool 322 (e.g., any number of discrete legs that extend outward from the end portion 330, etc.).

In the exemplary implementations shown herein, the workpiece surface 310 is approximately planar along the area that includes the target drilling location. In other implementations wherein the area of the workpiece surface 310 that includes the target drilling location includes a 3D shape (e.g., is contoured, etc.), the end portion 332 (e.g., the end surface 334, etc.) may include a 3D shape that is complementary with the 3D shape of the area of the workpiece surface 310 that includes the target drilling location (e.g., as opposed to the approximately planar geometry of the end surface 334 of the implementations shown herein, etc.).

The nosepiece 328 optionally includes a suction tube 338 that is configured to collect chips generated during drilling operations (e.g., during drilling of the workpiece 312, etc.). The suction tube 338 is configured to be fluidly connected to a suction system (not shown) that is configured to generate suction within the suction tube 338 that enables the suction tube 338 to collect the chips.

In the implementations shown herein, the drilling platform 302 is an articulated robot arm 302a that is configured to hold the drilling end effector 306, for example on an end portion 340 of the articulated robot arm 302a, as is shown in FIGS. 8 and 9. The articulated robot arm 302a of the exemplary implementations provides a fully automated drilling system 300. For example, the articulated robot arm 302a is configured to automatically move the drilling end effector 306 to the target drilling location on the workpiece surface 310 and activate the drilling end effector 306 to drill into the workpiece 312 using the drilling tool 322. The drilling system 300 includes a control system 342 operatively connected to (e.g., using a wired and/or wireless connection, etc.), or incorporated as a component of, the articulated robot arm 302a and/or the end effector 306 for controlling the drilling system 300. For example, the control system 342 is configured to control movement of the articulated robot arm 302a, activation of the drilling end effector 306 to drill into the workpiece 312, other control functions of the drilling system 300, and/or the like.

The drilling platform 302 is not limited to the articulated robot arm 302a. Rather, additionally or alternatively the drilling system 300 includes any other type of drilling platform (whether the drilling system 300 is fully automated, semi-automated, or fully manual), such as, but not limited to, a drill press, a fixture and/or other structure (e.g., a hanging structure, a structure that mounts to the workpiece 312, a structure that is adjacent the workpiece 312, a structure that rests on and/or is attached to a floor, etc.), a gantry-style drilling platform, a post-style drilling platform, a hand-held drilling platform (e.g., a hand-held battery, electrical corded, pneumatic, or hydraulic powered drill, etc.), a less-portable drilling apparatus, and/or the like.

In some implementations, such as, but not limited to, the exemplary implementations shown herein, the chuck 318 and the drilling tool 322 held thereby move relative to the drilling platform 302 and the base 316 of the drilling end effector 306 to move the drilling tool 322 along the axes 320 and 324 toward and into physical contact with the workpiece surface 310 (e.g., in the direction of the arrow 326, etc.); and the contact force between the drilling tool 322 and the workpiece surface 310 is provided by exerting a force on the chuck 318 and thereby the drilling tool 322 to force the drilling tool 322 against the workpiece surface 310.

The drilling system 300 includes any suitable mechanism, structure, and/or the like that enables the chuck 318 and drilling tool 322 to move along the axes 320 and 324 relative to the drilling platform 302 and the base 316 of the drilling end effector 306, such as, but not limited to, a mechanical quill, a bearing, and/or the like. The movement of, and force exerted on, the chuck 318 and thereby the drilling tool 322 to move the drilling tool 322 relative to the drilling platform 302 and the base 316 toward the workpiece surface 310 and provide the contact force between the drilling tool 322 and the workpiece surface 310 is fully automated in the exemplary implementations, for example using an electrical, hydraulic, and/or pneumatic linear actuator that is controlled by the control system 342, etc. In some other implementations, the movement of, and force exerted on, the chuck 318 to move the drilling tool 322 relative to the drilling platform 302 and the base 316 toward the workpiece surface 310 and provide the contact force between the drilling tool 322 and the workpiece surface 310 is: (1) assisted (e.g., semi-automated, etc.), for example using a hydraulic cylinder, a pneumatic cylinder, a gas spring, and/or the like; or (2) fully manual, for example performed wholly by an operator directly and/or indirectly exerting a force on the drilling tool 322 (e.g., using a hand crank, a handle, a drill press, etc.), etc. In the exemplary implementations of the drilling end effector 306 shown herein, the nosepiece 328 is rigid along the length thereof to enable the drilling tool 322 to move along the length of the nosepiece 328 (i.e., relative to the length of the nosepiece 328) toward the workpiece surface 310.

Examples of fully automated implementations include the exemplary implementation of the articulated robot arm 302a shown herein, an implementation wherein the drilling platform 302 includes a drill press, gantry, or post system that includes a linear actuator (not shown) that automatically moves the drilling tool 322 relative to the base 316 of the drilling end effector 306 and automatically exerts a force on the drilling tool 322 that provides the contact force between the drilling tool 322 and the workpiece surface 310, for example upon activation by an operator and/or a control system. An example of a semi-automated implementation is an implementation wherein the drilling platform 302 is a hand-held platform that includes a linear actuator and/or other mechanism that is configured to automatically move the drilling tool 322 relative to the base 316 of the drilling end effector 306 to automatically exert a force on the drilling tool 106 that provides the contact force, for example upon activation of the by an operator holding the drilling platform 302. Examples of manual systems include an implementation wherein the drilling platform 302 is a drill press that includes a hand crank that can be manually turned by an operator to indirectly move the drilling tool 322 relative to the base 316 and indirectly exert a force on the drilling tool 322 that provides the contact force between the drilling tool 322 and the workpiece surface 310.

In some other implementations, the drilling platform 302 and the base 316 of the drilling end effector 306 are: (1) moved along the axes 320 and 324 toward the workpiece surface 310 (e.g., in the direction of the arrow 326, etc.) to thereby move the drilling tool 322 toward and into physical contact with the workpiece surface 310; and (2) a force is exerted on the base 316 of the drilling end effector 306 to force the drilling tool 322 against the workpiece surface 310 and thereby provide the contact force between the drilling tool 322 and the workpiece surface 310. The movement of, and force exerted on, the base 316 of the drilling end effector 306 to move the drilling tool 322 toward the workpiece surface 310 and provide the contact force between the drilling tool 322 and the workpiece surface 310 is: (1) fully automated in some implementations; (2) assisted in some implementations (e.g., semi-automated, etc.); and (3) fully manual (e.g., performed wholly by an operator, etc.) in some implementations. Examples of fully automated implementations include an implementation wherein an articulated robot arm (e.g., the articulated robot arm 302a, etc.) automatically moves the base 316 of the drilling end effector 306 to thereby move the drilling tool 322 toward the workpiece surface 310 and provide the contact force between the drilling tool 322 and the workpiece surface 310. Examples of manual implementations include an implementation wherein an operator holding the drilling platform 302 manually moves the drilling platform 302 and thereby the base 316 of the drilling end effector 306 to thereby move the drilling tool 322 toward the workpiece surface 310 and manually exert the force on the drilling platform 302 and the base 316 that provides the contact force between the drilling tool 322 and the workpiece surface 310. In some implementations wherein the base 316 of the drilling end effector 306 is moved to thereby move the drilling tool 322 toward the workpiece surface 310 and provide the contact force between the drilling tool 322 and the workpiece surface 310, the nosepiece 328 is collapsible (e.g., resiliently, non-resiliently, etc.) along the length thereof to enable the drilling tool 322 to extend past the end portion 332 of the nosepiece 328 while the nosepiece 328 remains held on the workpiece surface 310 during drilling operations.

In the exemplary implementations shown herein, the drilling tool 322 is a drill bit, and more specifically a twist drill bit. But, the drilling tool 322 additionally or alternatively can include any type of drill bit, such as, but not limited to, a step drill bit, an unbit drill bit, a hole saw, a center and spotting drill bit, a core drill bit, a countersink bit, an ejector drill bit, a gun drill bit, an indexable drill bit, a left-hand bit, a metal spade bit, a straight fluted bit, a trepan, a lip and spur drill bit, a wood spade bit, a spoon bit, a forstner bit, a center bit, an auger bit, a gimlet bit, a hinge sinker bit, an adjustable wood bit, a metal drill bit, a diamond core bit, a masonry drill bit, a glass drill bit, a PCB through-hole drill bit, an installer bit, a fishing bit, a flexible shaft bit, and/or the like. Moreover, the drilling tool 322 is not limited to including a drill bit. Rather, the drilling tool 322 additionally or alternatively may include any other type of drilling tool, such as, but not limited to, a tap, a die, and/or the like.

In the illustrated implementations, the workpiece 312 is an aircraft component (e.g., an internal panel, an external skin panel, etc.). But, the workpiece 312 is not limited to being an aircraft component. Rather, the drilling system implementations shown and described herein are applicable to any type of workpiece into which a drilling operation is performed, such as, but not limited to, (e.g., an automotive component, a machine component, a marine component, a space component, a panel and/or other structure of a larger assembly, and/or the like. Moreover, as briefly described above, the workpiece surface 310 is not limited to being approximately planar (e.g., having an approximately two-dimensional (2D) shape, etc.) as is shown in FIGS. 1 and 2. Rather, in addition or alternatively to being approximately planar, one or more segments of the workpiece surface 310 is has a three-dimensional (3D) shape (e.g., is contoured, etc.) in other implementations.

Figure 10:
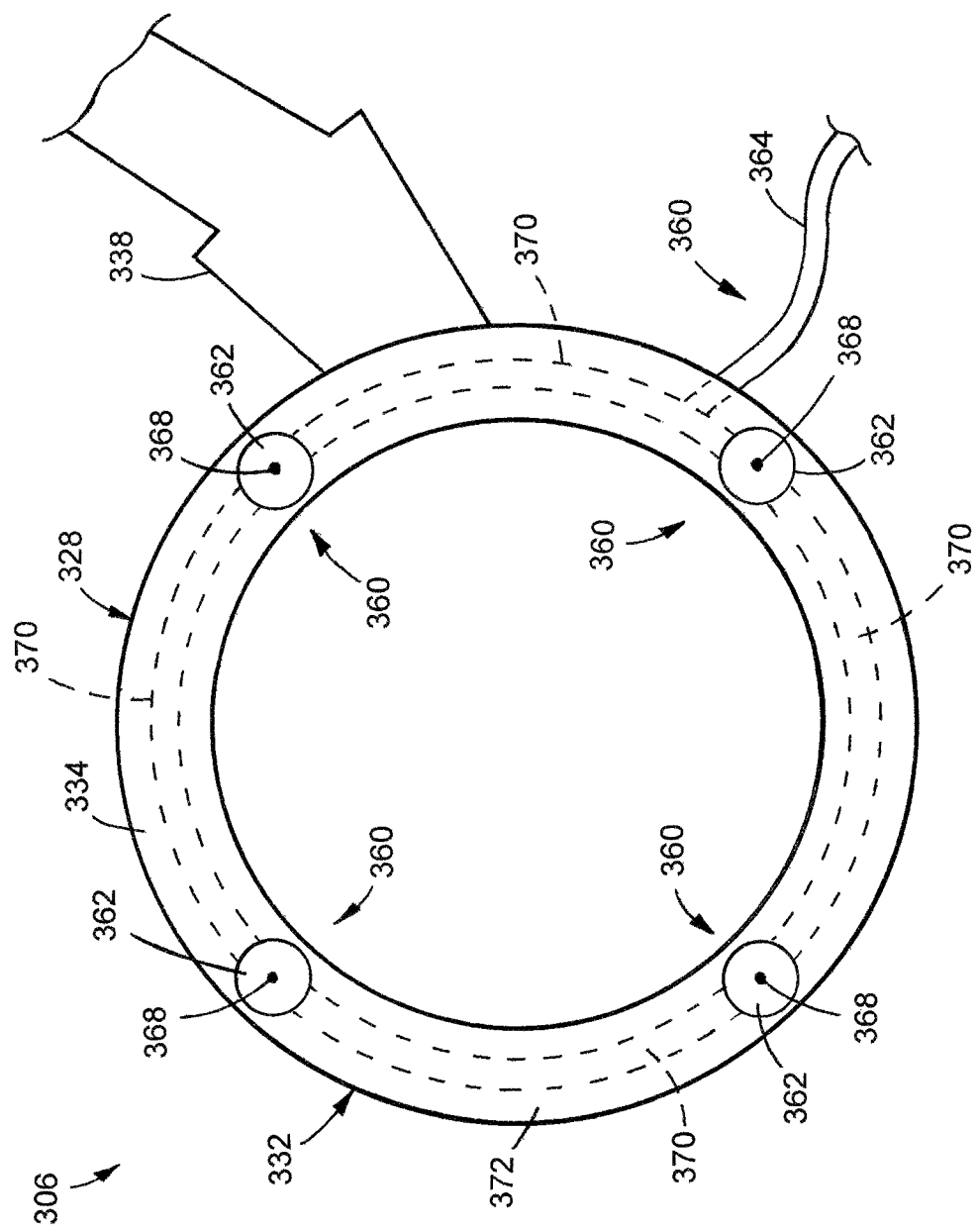
FIG. 10 is a bottom plan view of an end portion of a nosepiece of the drilling end effector shown in FIG. 8 according to an implementation.

Referring now to FIGS. 8 and 10, the suction clamp 360 will now be described. The suction clamp 360 includes one or more suction cups 362 and one or more suction feed lines 364. Specifically, the nosepiece 328 of the drilling end effector 306 includes the suction cup(s) 362 and the suction feed line(s) 364. In the exemplary implementations shown herein, the end portion 332 of the nosepiece 328 includes the suction cup(s) 362. Each suction cup 362 is fluidly connected to one or more corresponding suction feed lines 364, for example as is shown in FIG. 10. Each suction feed line 364 is fluidly connected to a suction system 366 (not shown in FIG. 10; e.g., of the drilling system 300, an external suction system 366 that is not a component of the drilling system 300, etc.) that is configured to generate suction at the suction cup(s) 362.

As briefly described above, the suction clamp 360 is configured to hold the nosepiece 328 to the workpiece surface 310. Specifically, in operation, the end portion 332 of the nosepiece 328 is positioned on the workpiece surface 310 of the workpiece 312 over the target drilling location such that the drilling tool 322 is aligned with the target drilling location on the workpiece surface 310 and such that the suction cup(s) 362 are engaged in physical contact with the workpiece surface 310. In the exemplary implementations shown herein, the control system 342 automatically commands the articulated robot arm 302a to automatically position the nosepiece 328 on the workpiece surface 310 over the target drilling location 336. In other implementations, another type of fully automated drilling system or a semi-automated drilling system automatically positions the end portion 332 of the nosepiece 328 on the workpiece surface 310 over the target drilling location. In still other implementations, an operator manually positions the end portion 332 of the nosepiece 328 on the workpiece surface 310 over the target drilling location.

Once the end portion 332 of the nosepiece 328 has been positioned on the workpiece surface 310 over the target drilling location, the suction system 366 is activated to pull the suction cup(s) 362 under suction such that the suction cup(s) 362 adhere to the workpiece surface 310. The adherence of the suction cup(s) 362 to the workpiece surface 310 holds the end portion 332 of the nosepiece 328 on the workpiece surface 310 (e.g., as is shown in FIG. 8, etc.) such that the drilling tool 322 remains aligned with the target drilling location.

In the exemplary implementations shown herein, the control system 342 automatically activates the suction system 366 to pull the suction cup(s) 362 under suction. In other implementations, another type of fully automated drilling system or a semi-automated drilling system automatically activates the suction system 366. In still other implementations, an operator manually activates the suction system 366.

Optionally, one or more suction cups 362 includes a strain gauge 368 that is configured to measure a load that represents a contact force (e.g., amount of suction, etc.) exerted on the workpiece surface 310 by the suction cup(s) 362. on the end portion 132 of the nosepiece 128 by a contact force between the end surface 134 of the nosepiece 128 and the workpiece surface 110. Each strain gauge 368 measures the contact force exerted on the workpiece surface 310 in any units, such as, but not limited to, pounds (lbs.), kilograms (kgs.), and/or the like. In some implementations, one or more cameras (e.g., the camera 114 shown in FIGS. 1 and 2, etc.) and one or more displays (e.g., the display 150 shown in FIG. 1, the display 152 shown in FIG. 1, etc.) to display the loads measured by the strain gauge(s) 368. In implementations wherein more than one strain gauge 368 is included, the load measured by each strain gauge 368 may be displayed individually and/or as an average of the measurements of two or more of the strain gauges 368. Although four are shown, any number of the strain gauges 368 may be provided, whether the number of strain gauges 368 is the same as the number of suction cups 362.

Although four are shown in FIG. 10, the nosepiece 328 may include any other number of suction cups 362. Moreover, the suction cup(s) 362 may have configuration, arrangement, and/or the like that enables the suction clamp 360 to function as described and/or illustrated herein (e.g., to hold the end portion 332 of the nosepiece 328 on the workpiece surface 310 such that the drilling tool 322 remains aligned with the target drilling location, etc.). For example, in some implementations the end surface 334 of the nosepiece 328 is engaged in physical contact with the workpiece surface 310 when the end portion 332 of the nosepiece 328 is held on the workpiece surface 310 by the suction clamp 360, while in other implementations the end surface 334 of the nosepiece 328 is not engaged in physical contact with the workpiece surface 110 when the end portion of the nosepiece 328 is held on the workpiece surface 310 by the suction clamp 360.

Figure 11:
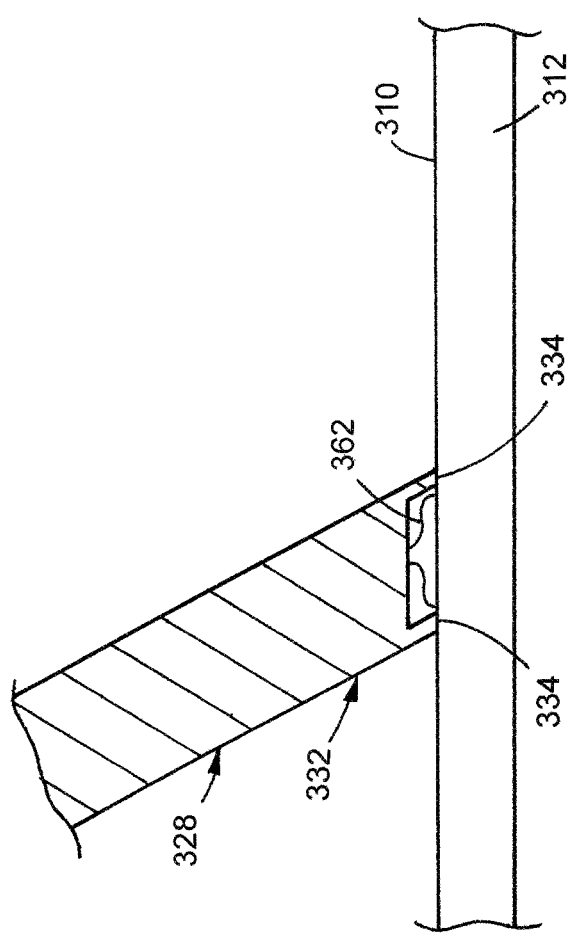
FIG. 11 is a partially cut-away elevational view illustrating a configuration, arrangement, and/or the like of a suction cup according to an implementation.
Figure 12:
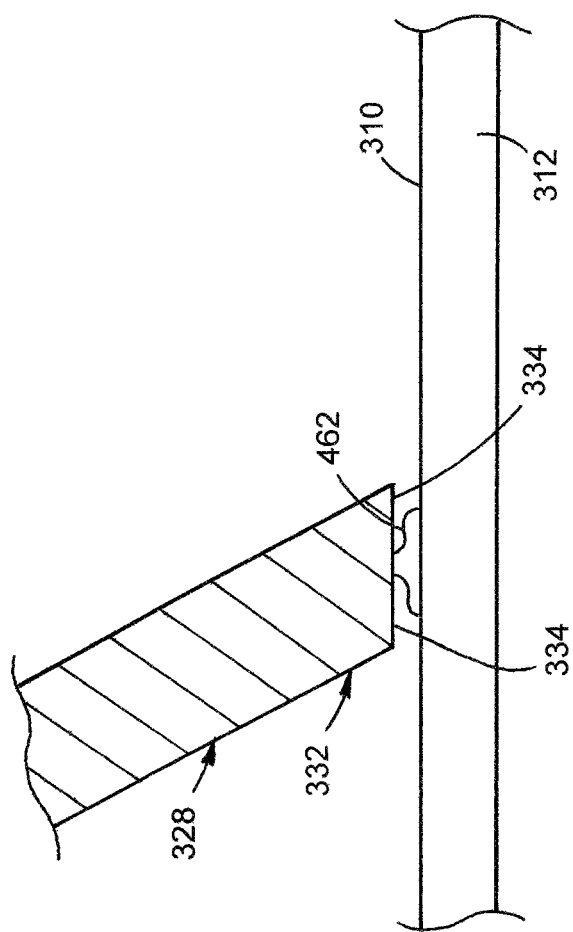
FIG. 12 is a partially cut-away elevational view illustrating a configuration, arrangement, and/or the like of a suction cup according to another implementation.
Figure 13:
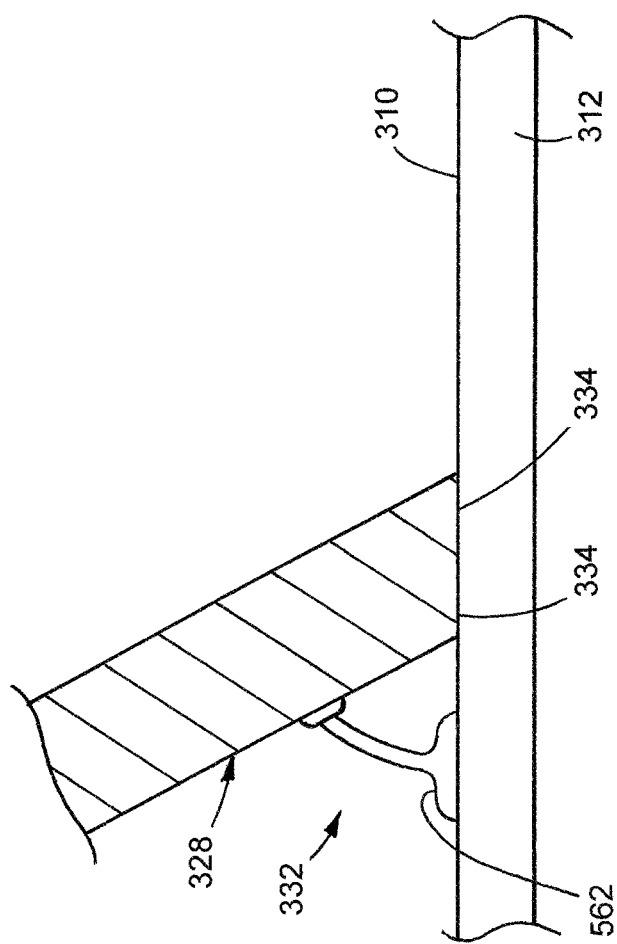
FIG. 13 is a partially cut-away elevational view illustrating a configuration, arrangement, and/or the like of a suction cup according to yet another implementation.
Figure 14:
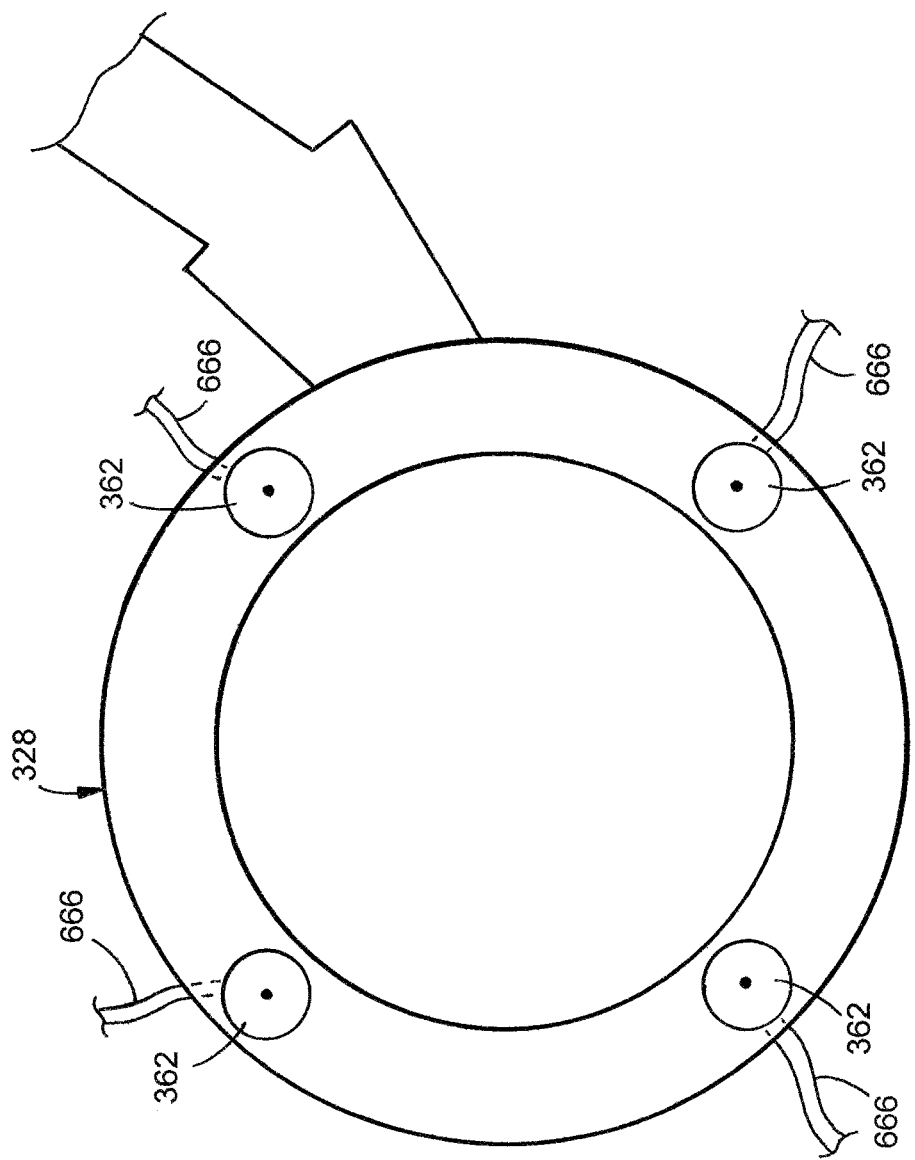
FIG. 14 is a bottom plan view illustrating a configuration, arrangement, and/or the like of a suction feed line according to an implementation.

Referring now to FIG. 11, in the exemplary implementation shown in FIGS. 8, 10, and 11, the end surface 334 of the nosepiece 328 includes the suction cups 362, which are recessed into the end surface 334 to enable the end surface 334 of the nosepiece 328 to be engaged in physical contact with the workpiece surface 310 while the suction cups 362 hold the end portion 332 of the nosepiece 328 on the workpiece surface 310. In another example of the configuration, arrangement, and/or the like of the suction cups 362 shown in FIG. 12, the end surface 334 of the nosepiece 328 includes one or more suction cups 462 that extend outward from the end surface 334 such that the end surface 334 of the nosepiece 328 is not engaged in physical contact with the workpiece surface 310 while the suction cups 462 hold the end portion 332 of the nosepiece 328 on the workpiece surface 310. In still another example of the configuration, arrangement, and/or the like of the suction cups 362 that is shown in FIG. 13, the end portion 332 of the nosepiece 328 includes one or more suction cups 562 that is positioned alongside the end surface 334 of the nosepiece 328. In the example shown in FIG. 13, the suction cups 562 are positioned relative to the end surface 334 of the nosepiece 328 such that the end surface 334 is engaged in physical contact with the workpiece surface 310 when the end portion 332 of the nosepiece 328 is held on the workpiece surface 310 by the suction cups 562. In some other implementations, the suction cups 562 are positioned alongside the end surface 334 of the nosepiece 328 such that the end surface 334 is not engaged in physical contact with the workpiece surface 310 when the end portion 332 of the nosepiece 328 is held on the workpiece surface 310 by the suction cups 562.

Although only a single suction feed line 364 is shown in FIG. 10, the nosepiece 328 may include any other number of suction feed lines 364. Moreover, the suction feed line(s) 364 and suction cup(s) 362 may have configuration, arrangement, and/or the like (e.g., of fluid connectivity, etc.) that enables the suction clamp 360 to function as described and/or illustrated herein (e.g., to hold the end portion 332 of the nosepiece 328 on the workpiece surface 310 such that the drilling tool 322 remains aligned with the target drilling location, etc.). For example, in the exemplary implementation shown in FIG. 10, the suction cups 362 are fluidly connected to each other (e.g., via exemplary channels 370 within a body 372 of the nosepiece 328, etc.) and the suction feed line 364. The fluid connection between the suction cups 362 and the suction feed line 364 may be provided by a fluid connection of the suction feed line 366 to one or more of the channels 370 (e.g., as is shown in FIG. 10, etc.) and/or by a direct fluid connection of the suction feed line 366 to one or more of the suction cups 362. In another example shown in FIG. 14, the nosepiece 328 includes two or more suction cups 362 that are each independently fluidly connected to the suction system 360 (shown in FIG. 8) through a corresponding suction feed line 666. In some implementations, the suction feed line 366 is at least partially embedded within the body 372 of the nosepiece 328, for example as is shown in FIG. 10, etc.

Figure 15:
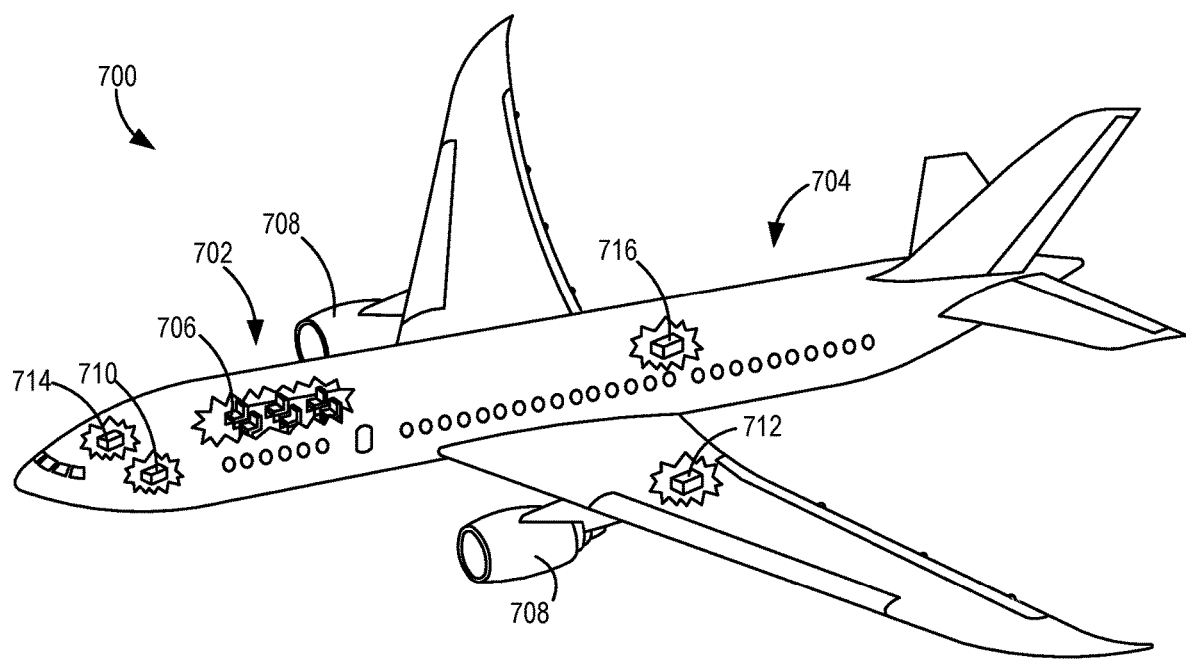
FIG. 15 is a schematic view of an implementation of an aircraft.

Referring now to FIG. 15, examples of the disclosure may be described in the context of using the positioning device to build one or more portions of an aircraft 700 that includes an airframe 702 with a plurality of high-level systems 704 and an interior 706. Examples of high-level systems 704 include one or more of a propulsion system 708, an electrical system 710, a hydraulic fluid system 712, a control system 714, and an environmental system 716. Any number of other systems can be included. Although an aerospace example is shown, the principles can be applied to other industries, such as, but not limited to, the automotive industry, the marine industry, and/or the like.

Figure 16:
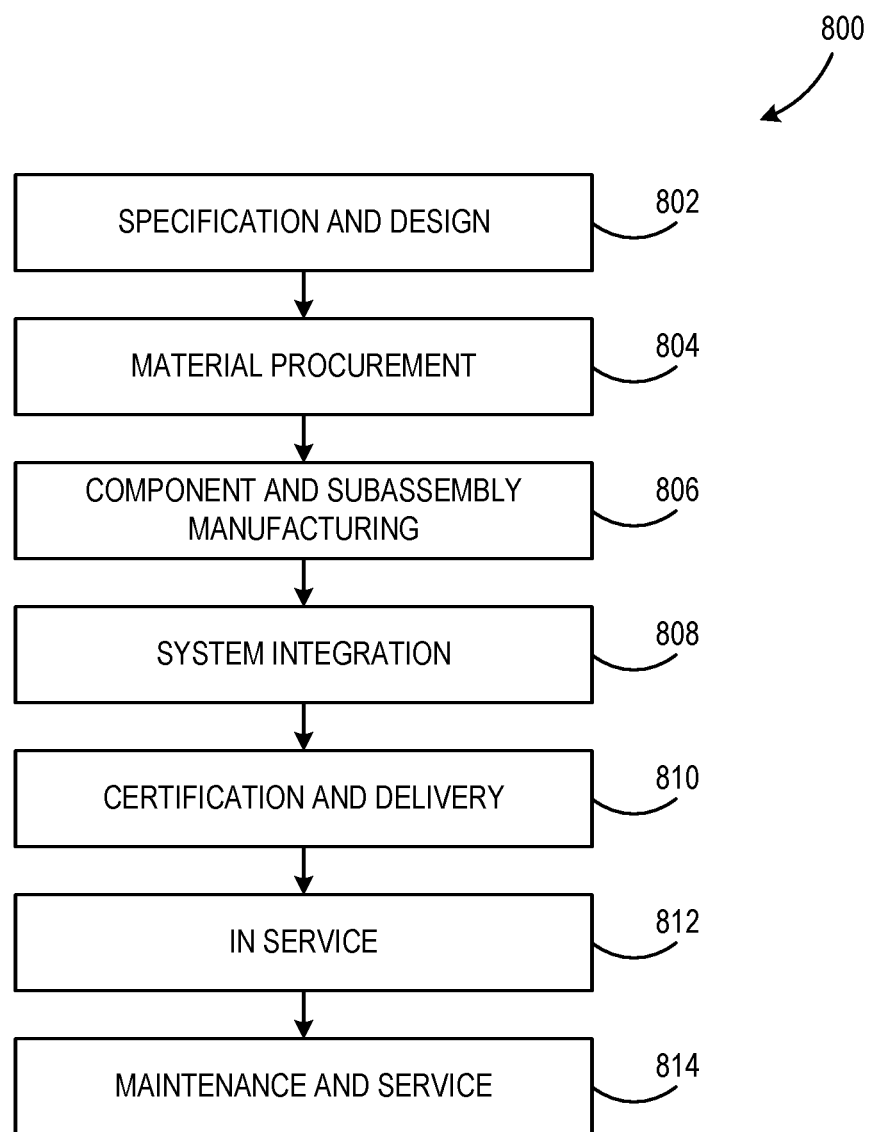
FIG. 16 is a block diagram of an implementation of an aircraft production and service methodology.

Examples of the disclosure can be described in the context of an aircraft manufacturing and service method 800 as shown in FIG. 16. During pre-production, illustrative method 800 can include specification and design 802 of an aircraft (e.g., aircraft 700 shown in FIG. 15, etc.) and material procurement 804. During production, component and subassembly manufacturing 806 and system integration 808 of the aircraft take place. Thereafter, the aircraft can go through certification and delivery 810 to be placed in service 812. While in service by a customer, the aircraft is scheduled for routine maintenance and service 814 (which can also include modification, reconfiguration, refurbishment, and so on).

Each of the processes of the illustrative method 800 can be performed or carried out by a system integrator, a third party, and/or an operator (e.g., a customer, etc.). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as, but not limited to, the automotive industry, the marine industry, and/or the like.

Systems and methods shown or described herein can be employed during any one or more of the stages of the manufacturing and service method 800. For example, components or subassemblies corresponding to component and subassembly manufacturing 806 can be fabricated or manufactured in a manner similar to components or subassemblies produced while the aircraft is in service. Also, one or more aspects of the system, method, or combination thereof can be utilized during the production states of subassembly manufacturing 806 and system integration 808, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 814.

Various implementations of the present disclosure facilitate aligning a drilling tool with a target drilling location on a workpiece surface. Various implementations of the present disclosure facilitate detecting, reducing, and/or correcting for movement (e.g., sliding, skidding, skating, etc.) of the drilling tool away from the target drilling location on the workpiece surface, for example before performing a drilling operation on the workpiece. Various implementations of the present disclosure facilitate preventing movement (e.g., sliding, skidding, skating, etc.) of the drilling tool away from the target drilling location on the workpiece surface, for example before and/or during the performance of a drilling operation on the workpiece.

Various implementations of the present disclosure reduce the occurrence of openings being drilled at inaccurate locations (e.g., an opening misaligned with the target drilling location, etc.) on the workpiece surface. Various implementations of the present disclosure reduce damage (e.g., scratches, scrapes, gashes, etc.) caused to the workpiece and/or other structures (e.g., attaching substructure, etc.) resulting from the drilling tool moving along the workpiece surface. Various implementations of the present disclosure reduce the number of broken drilling tools resulting from repeated drilling operations. Various implementations of the present disclosure facilitate detecting, preventing, reducing, and/or correcting for movement (e.g., sliding, skidding, skating, etc.) of a drilling tool away from the target drilling location without increasing the cost and/or complexity of one or more components (e.g., an articulated robot arm, a drilling end effector, an automation cell in which a drilling operation is performed, a control system, etc.) of the drilling system. For example, various implementations of the present disclosure utilize the capabilities of an existing camera on a drilling end effector.

The following clauses describe further aspects:

Clause Set A:

A1. A drilling end effector for drilling a workpiece having a workpiece surface, the drilling end effector comprising:
 a chuck configured to hold a drilling tool; and
 a nosepiece configured to at least partially surround the drilling tool when the drilling tool is held by the chuck, the nosepiece comprising an end portion, the nosepiece comprising at least one suction cup and at least one suction feed line, the at least one suction cup being fluidly connected to the at least one suction feed line, the at least one suction feed line being configured to be fluidly connected to a suction system, wherein the at least one suction cup is configured to be engaged in physical contact with the workpiece surface and pulled under suction by the suction system such that the at least one suction cup adheres to the workpiece surface to thereby hold the end portion of the nosepiece on the workpiece surface.

A2. The drilling end effector of clause A1, wherein the end portion of the nosepiece comprises the at least one suction cup.

A3. The drilling end effector of clause A1, wherein the end portion of the nosepiece comprises an end surface that is configured to face the workpiece surface of the workpiece during drilling of the workpiece, the end surface of the nosepiece comprising the at least one suction cup.

A4. The drilling end effector of clause A1, wherein the end portion of the nosepiece comprises an end surface that is configured to engage in physical contact with the workpiece surface of the workpiece during drilling of the workpiece, the end surface of the nosepiece comprising the at least one suction cup, wherein the at least one suction cup is at least partially recessed into the end surface.

A5. The drilling end effector of clause A1, wherein the end portion of the nosepiece comprises an end surface that is configured to engage in physical contact with the workpiece surface of the workpiece during drilling of the workpiece, the end portion of the nosepiece comprising the at least one suction cup such that the at least one suction cup is positioned alongside the end surface of the nosepiece.

A6. The drilling end effector of clause A1, wherein the at least one suction feed line is at least partially embedded within a body of the nosepiece.

A7. The drilling end effector of clause A1, wherein the at least one suction cup comprises a plurality of suction cups and the at least one suction feed line comprises a plurality of suction feed lines, each of the plurality of suction cups being configured to be independently fluidly connected to the suction system through a corresponding one of the plurality of suction feed lines.

A8. The drilling end effector of clause A1, wherein the at least one suction cup comprises a plurality of suction cups fluidly connected to each other and the at least one suction feed line.

A9. The drilling end effector of clause A1, further comprising a camera configured to acquire an image of the workpiece surface that is configured to indicate whether the drilling tool is aligned with a target drilling location.

A10. The drilling end effector of clause A1, wherein the at least one suction cup comprises at least one strain gauge.

A11. The drilling end effector of clause A1, wherein the drilling end effector is configured to be held by an articulated robot arm.

Clause Set B:

B1. A drilling system for drilling a workpiece having a workpiece surface, the drilling system comprising:
 a drilling platform;
 a drilling end effector configured to be held by the drilling platform, the drilling end effector comprising:
  a chuck configured to hold a drilling tool; and
  a nosepiece configured to at least partially surround the drilling tool when the drilling tool is held by the chuck, the nosepiece comprising an end portion, the nosepiece comprising at least one suction cup and at least one suction feed line, the at least one suction cup being fluidly connected to the at least one suction feed line, the at least one suction feed line being configured to be fluidly connected to a suction system, wherein the at least one suction cup is configured to be engaged in physical contact with the workpiece surface and pulled under suction by the suction system such that the at least one suction cup adheres to the workpiece surface to thereby hold the end portion of the nosepiece on the workpiece surface.

B2. The drilling system of clause B1, wherein the end portion of the nosepiece comprises the at least one suction cup.

B3. The drilling system of clause B1, wherein the end portion of the nosepiece comprises an end surface that is configured to face the workpiece surface of the workpiece during drilling of the workpiece, the end surface of the nosepiece comprising the at least one suction cup.

B4. The drilling system of clause B1, wherein the end portion of the nosepiece comprises an end surface that is configured to engage in physical contact with the workpiece surface of the workpiece during drilling of the workpiece, the end surface of the nosepiece comprising the at least one suction cup, wherein the at least one suction cup is at least partially recessed into the end surface.

B5. The drilling system of clause B1, wherein the at least one suction feed line is at least partially embedded within a body of the nosepiece.

B6. The drilling system of clause B1, wherein the at least one suction cup comprises at least one strain gauge.

B7. The drilling system of clause B1, wherein the drilling platform comprises an articulated robot arm.

Clause Set C:

C1. A drilling end effector for drilling a workpiece having a workpiece surface, the drilling end effector comprising:
 a chuck configured to hold a drilling tool; and
 a nosepiece configured to at least partially surround the drilling tool when the drilling tool is held by the chuck, the nosepiece comprising an end portion that includes an end surface that is configured to face the workpiece surface during drilling of the workpiece, the nosepiece comprising at least one suction feed line, the end surface of the end portion of the nosepiece comprising the at least one suction cup, the at least one suction cup being fluidly connected to the at least one suction feed line, the at least one suction feed line being configured to be fluidly connected to a suction system, the nosepiece further comprising a suction tube configured to collect chips during drilling of the workpiece, wherein the at least one suction cup is configured to be engaged in physical contact with the workpiece surface and pulled under suction by the suction system such that the at least one suction cup adheres to the workpiece surface to thereby hold the end portion of the nosepiece on the workpiece surface.

C2. The drilling end effector of clause C1, wherein the at least one suction cup is at least partially recessed into the end surface.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §

112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A drilling end effector for drilling a workpiece having a workpiece surface, the drilling end effector comprising:
   a chuck configured to hold a drilling tool; and
   a nosepiece extending along a length of the drilling tool, the nosepiece configured to at least partially surround the drilling tool when the drilling tool is held by the chuck, the nosepiece comprising an end portion, the nosepiece comprising at least one suction cup and at least one suction feed line, the at least one suction cup being fluidly connected to the at least one suction feed line, the at least one suction feed line being configured to be fluidly connected to a suction system, wherein the at least one suction cup is configured to be engaged in physical contact with the workpiece surface and pulled under suction by the suction system such that the at least one suction cup adheres to the workpiece surface to thereby hold the end portion of the nosepiece on the workpiece surface.

2. The drilling end effector of claim 1, wherein the end portion of the nosepiece comprises the at least one suction cup.

3. The drilling end effector of claim 1, wherein the end portion of the nosepiece comprises an end surface that is configured to face the workpiece surface of the workpiece during drilling of the workpiece, the end surface of the nosepiece comprising the at least one suction cup.

4. The drilling end effector of claim 1, wherein the end portion of the nosepiece comprises an end surface that is configured to engage in physical contact with the workpiece surface of the workpiece during drilling of the workpiece, the end surface of the nosepiece comprising the at least one suction cup, wherein the at least one suction cup is at least partially recessed into the end surface.

5. The drilling end effector of claim 1, wherein the end portion of the nosepiece comprises an end surface that is configured to engage in physical contact with the workpiece surface of the workpiece during drilling of the workpiece, the end portion of the nosepiece comprising the at least one suction cup such that the at least one suction cup is positioned alongside the end surface of the nosepiece.

6. The drilling end effector of claim 1, wherein the at least one suction feed line is at least partially embedded within a body of the nosepiece.

7. The drilling end effector of claim 1, wherein the at least one suction cup comprises a plurality of suction cups and the at least one suction feed line comprises a plurality of suction feed lines, each of the plurality of suction cups being configured to be independently fluidly connected to the suction system through a corresponding one of the plurality of suction feed lines.

8. The drilling end effector of claim 1, wherein the at least one suction cup comprises a plurality of suction cups fluidly connected to each other and the at least one suction feed line.

9. The drilling end effector of claim 1, further comprising a camera configured to acquire an image of the workpiece surface that is configured to indicate whether the drilling tool is aligned with a target drilling location.

10. The drilling end effector of claim 1, further comprising a base, wherein the nosepiece is mounted to the base, and wherein the nosepiece extends from the base to an end to the drilling tool.

11. The drilling end effector of claim 1, wherein the drilling end effector is configured to be held by an articulated robot arm.

12. A drilling system for drilling a workpiece having a workpiece surface, the drilling system comprising:
    a drilling platform;
    a drilling end effector configured to be held by the drilling platform, the drilling end effector comprising:
       a chuck configured to hold a drilling tool; and
       a nosepiece extending along a length of the drilling tool, the nosepiece configured to at least partially surround the drilling tool when the drilling tool is held by the chuck, the nosepiece comprising an end portion, the nosepiece comprising at least one suction cup and at least one suction feed line, the at least one suction cup being fluidly connected to the at least one suction feed line, the at least one suction feed line being configured to be fluidly connected to a suction system, wherein the at least one suction cup is configured to be engaged in physical contact with the workpiece surface and pulled under suction by the suction system such that the at least one suction cup adheres to the workpiece surface to thereby hold the end portion of the nosepiece on the workpiece surface.

13. The drilling system of claim 12, wherein the end portion of the nosepiece comprises the at least one suction cup.

14. The drilling system of claim 12, wherein the end portion of the nosepiece comprises an end surface that is configured to face the workpiece surface of the workpiece during drilling of the workpiece, the end surface of the nosepiece comprising the at least one suction cup.

15. The drilling system of claim 12, wherein the end portion of the nosepiece comprises an end surface that is configured to engage in physical contact with the workpiece surface of the workpiece during drilling of the workpiece, the end surface of the nosepiece comprising the at least one suction cup, wherein the at least one suction cup is at least partially recessed into the end surface.

16. The drilling system of claim 12, wherein the at least one suction feed line is at least partially embedded within a body of the nosepiece.

17. The drilling system of claim 12, wherein the at least one suction cup comprises at least one strain gauge.

18. The drilling system of claim 12, wherein the drilling platform comprises an articulated robot arm.

19. A drilling end effector for drilling a workpiece having a workpiece surface, the drilling end effector comprising:
    a chuck configured to hold a drilling tool; and
    a nosepiece extending along a length of the drilling tool, the nosepiece configured to at least partially surround the drilling tool when the drilling tool is held by the chuck, the nosepiece comprising an end portion that includes an end surface that is configured to face the workpiece surface during drilling of the workpiece, the nosepiece comprising at least one suction feed line, the end surface of the end portion of the nosepiece comprising the at least one suction cup, the at least one suction cup being fluidly connected to the at least one suction feed line, the at least one suction feed line being configured to be fluidly connected to a suction system, the nosepiece further comprising a suction tube configured to collect chips during drilling of the workpiece, wherein the at least one suction cup is configured to be engaged in physical contact with the workpiece surface and pulled under suction by the suction system such that the at least one suction cup adheres to the workpiece surface to thereby hold the end portion of the nosepiece on the workpiece surface.

20. The drilling end effector of claim 19, wherein the at least one suction cup is at least partially recessed into the end surface.

\* \* \* \* \*